United States Patent
Bennett et al.

(10) Patent No.: US 6,847,504 B1
(45) Date of Patent: Jan. 25, 2005

(54) SPLIT VCM ACTUATOR

(75) Inventors: George J. Bennett, Murrieta, CA (US); Charles R. Patton, III, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 449 days.

(21) Appl. No.: 10/137,227

(22) Filed: Apr. 30, 2002

(51) Int. Cl.[7] .............................................. G11B 5/596
(52) U.S. Cl. ................................. 360/78.12; 360/77.02
(58) Field of Search ........................ 360/78.12, 78.04, 360/75, 77.02, 77.06, 97.01, 97.02, 25, 31, 245.2, 245.7, 264.4, 264.5, 264.7

(56) References Cited

U.S. PATENT DOCUMENTS

| | | | | |
|---|---|---|---|---|
| 4,943,875 | A | * | 7/1990 | Reidenbach et al. ...... 360/245.2 |
| 6,005,743 | A | | 12/1999 | Price et al. |
| 6,104,581 | A | | 8/2000 | Huang et al. |
| 6,226,156 | B1 | | 5/2001 | Kasetty et al. |
| 6,301,073 | B1 | * | 10/2001 | Gillis et al. .............. 360/97.01 |
| 6,344,938 | B1 | * | 2/2002 | Smith .......................... 360/25 |
| 6,378,037 | B1 | * | 4/2002 | Hall ........................... 711/113 |
| 6,442,002 | B1 | * | 8/2002 | Pan .......................... 360/266.1 |
| 6,587,301 | B1 | * | 7/2003 | Smith .......................... 360/75 |
| 6,600,622 | B1 | * | 7/2003 | Smith ..................... 360/77.06 |
| 6,618,221 | B2 | * | 9/2003 | Gillis et al. ............... 360/97.02 |
| 6,653,763 | B2 | * | 11/2003 | Wang et al. ................. 310/369 |
| 6,680,806 | B2 | * | 1/2004 | Smith ........................... 360/31 |
| 6,683,737 | B2 | * | 1/2004 | Gong et al. .................... 360/31 |
| 6,697,214 | B2 | * | 2/2004 | Dimitri et al. ............ 360/97.01 |
| 6,710,952 | B1 | * | 3/2004 | Smith ........................... 360/31 |
| 6,747,849 | B1 | * | 6/2004 | Le et al. ................... 360/245.7 |

* cited by examiner

*Primary Examiner*—Sinh Tran
*Assistant Examiner*—Fred Tzeng
(74) *Attorney, Agent, or Firm*—Milad G. Shara, Esq.; Knobbe Martens Olson & Bear LLP

(57) ABSTRACT

A split actuator comprising two spring coupled actuators that share a common pivot bearing. The two reduced inertia actuators permit overlapping motions during a seek operation thereby reducing dead times in transfer of data between disk and transducers disposed on the actuators. A spring member that spring couples the two actuators boosts relative motions by storing and releasing spring potential energy selectively. The spring member is also configured so as to substantially restrict the relative motions of the two actuators to rotational motions about a common axis of the common pivot bearing. Rigidity of the spring member to non-rotational relative motions, as well as tuning of the spring member to provide a rigid response to selected frequencies, the spring member in conjunction with the common pivot bearing result in mechanical disturbance being substantially common to the two actuators, thereby allowing predictable and manageable disturbance corrections.

51 Claims, 13 Drawing Sheets

SPLIT VCM ACTUATOR

BACKGROUND OF THE INVENTION

1. Field of the Invention

The invention relates to computer data storage and, in particular, relates to a disk drive having a split VCM actuator that provides advantages in performance and cost savings.

2. Description of the Related Art

Disk drive storage devices are an important component in virtually all computer systems. In particular, disk drives provide computer systems with the ability to store and retrieve data in a non-volatile manner such that the data is maintained even if power is removed from the device. The popularity of these devices is based on their ability to quickly store and retrieve large quantities of digital information at low cost.

The typical disk drive comprises one or more pivotally mounted disks (also referred to as platters) having a magnetic recording layer disposed thereon and one or more magnetic transducer elements for affecting and sensing the magnetization states of the recording layer. Typically one transducer is associated with one magnetic layer of the disk. Thus, for example, a single disk having two recording layers has one transducer disposed adjacent each of the two recording layers, for a total of two transducers.

The recording layer comprises a large number of relatively small domains disposed thereon that can be independently magnetized according to a localized applied magnetic field and that can be maintained in the magnetized state when the external field is removed. The domains are grouped into concentric circular tracks each having a unique radius on the disk, and data is written to or read from each track by positioning the transducer over the disk at the corresponding radius while the disk is rotated at a fixed angular speed.

To position the transducer with respect to the disk, the typical disk drive further comprises a pivotally mounted actuator, typically using a pivot bearing. The transducer is typically mounted on one end of the actuator, and the other end of the actuator comprises a coil that forms part of a voice coil motor (VCM). The actuator is mechanically balanced with respect to the pivot bearing so as to facilitate rotation of the actuator, and thus the movement of the transducer, by a torque exerted by the VCM in a manner known in the art. To apply the torque to the actuator in a controlled manner, the disk drive further comprises a servo-controller for controlling the VCM. The VCM comprises a coil of conducting wire wound into a plurality of loops and a permanent magnet disposed adjacent the coil. The servo-controller initiates movement of the actuator arm by directing a control current to flow through the coil that generates a torque that causes rotation of the actuator about its pivot bearing. Because the direction of the torque is dictated by the direction of control current flow, the servo-controller is able to move the transducer to a different location by first directing the control current through the coil so as to angularly accelerate the actuator in a first direction and then reversing the control current so as to angularly decelerate the actuator.

The movement of the transducer in the foregoing manner is known as a seek operation, wherein the transducer is moved from a first track location to a second track location. The distance between the first and second track locations is known as a seek length, and is typically expressed as the number of tracks between the first and second track locations. The time required to complete the seek operation is known as a seek time, and the seek time is one of the parameters that contribute to the overall performance of the disk drive.

A traditional actuator that performs the aforementioned seek operation is typically configured such that all the transducers mounted thereon are substantially fixed relative to each other. As a result, the transducers mounted on the common actuator move in unison during seek operations. Such fixed configuration of the transducers and the common actuator has drawbacks that are well known in the art.

One drawback associated with the common actuator with multiple transducers relates to a relatively large moment of inertia resulting from such a configuration. As is understood in the art, moment of inertia of a rotating object is inversely proportional to its angular acceleration resulting from a given applied torque. Thus the common actuator having a relatively large moment of inertia accelerates at a lower rate, disadvantageously resulting in longer seek times. One way to compensate for the relatively large moment of inertia of the actuator, so as to achieve greater acceleration, is to increase the torque applied to the actuator. As is also understood in the art, such increase in applied torque disadvantageously requires greater power expenditure or use of higher torque generating (and higher cost) magnets.

Another drawback associated with the common actuator relates to the common motion of the transducers during seek operations. Because the transducers move in unison, seek operations result in "dead times" during which data is not transferred between the transducer(s) and the recording layers (read or write). Data transferred between the transducer(s) and the recording layers (read or write) is called a disk data transfer. The dead times disadvantageously leave gaps interspersed between active time segments of available data transfer time that affects the rate at which information can be transferred between the disk and a host computer (referred to as throughput). Host to disk data transfers are distinguished from internal transfers by calling them host data transfers.

To maintain a specified throughput capability of the disk drive, the dead time gaps can be compensated for in various manners. A general solution is to increase the rate at which data is transferred from the disk to the host computer during the "live" (non-dead) times. This objective can be achieved by increasing the bandwidth of a data channel through which the data to and from the disk is processed. Concurrently, the rate of data transfer between the transducer and the disk can be increased. One way to achieve increase in the data transfer rate between the transducer and the disk is to increase the rotational speed of the disk. As is understood in the art, increasing the rotational speed of the disk increases the rate at which the transducer interacts with the magnetic domains disposed on the tracks.

Spinning the disk faster, however, has drawbacks. For example, spinup time is longer for a faster spinning disk. Also, the track density of the disk, typically expressed as tracks per inch (TPI), needs to be decreased in order to accommodate effects associated with increase in rotational speed of the disk. These effects include aerodynamic vibrations between the transducer and the disk, bearing vibrations, and other disturbance producing forces. Thus in order to maintain a specified storage capacity of the disk drive, the number of disks needs to increase to compensate for the reduction in TPI. Such an increase in the number of disks, along with the increase in rotational speed, lead to additional heat generation and acoustic effects that need to be dealt with. Furthermore, material cost associated with additional disks is a substantial amount.

From the foregoing, it will be appreciated that various solutions are implemented to compensate for the dead time gaps in data transfer associated with the common actuator. Each of the various solutions described has advantages and drawbacks associated with it. Hence, as is well known in the art, a great deal of effort is made in the disk drive industry to reduce or eliminate the seek time.

One solution proposed for reducing or eliminating the dead time gaps in data transfer is to perform overlapping seek operations using two or more independent actuators. The dead time gaps may be eliminated in such a multiple actuator disk drive by, for example, performing a seek operation with a first transducer mounted on a first actuator while a second transducer mounted on a second actuator is performing a data transfer operation. Thus, seek operations performed by each of the actuators is hidden such that dead time gaps do not exist in the overall data transfer. Examples of disk drives that utilize multiple actuators and thus are adaptable for such hidden seek tasks are disclosed in U.S. Pat. No. 5,343,345 to Gilovich, U.S. Pat. No. 5,761,007 to Price et al (assigned to International Business Machines Corporation), and U.S. Pat. No. 5,901,010 to Glover et al (assigned to Cirrus Logic, Inc.).

Unfortunately the independent actuators exemplified in the disclosed patents suffer from drawbacks, including mechanical disturbance crosstalk between the two actuators. Specifically, each of the two actuators is mounted on its own pivot bearing assembly, typically in the form of a ball bearing. Each actuator and bearing generates a mechanical disturbance that is independent of the other actuator and its bearing. The two sources of vibration are known to combine in a manner that makes compensation of each transducer substantially difficult. Expected performance gains have not been realized because of these problems, and the dual actuator drives have not done well in the market as a result.

Thus from the foregoing drawbacks associated with the common actuator and problems encountered by proposed solutions, it will be appreciated that there is a continuing need for improving the manner in which transducers are moved. To this end, there is a need for an apparatus that allows seeks to be overlapped effectively so as to reduce or eliminate dead time gaps in the data transfer to and from the disk. There is a need for an actuator that performs such operations while effectively compensating for the debilitating vibrations.

SUMMARY OF THE INVENTION

One aspect of the invention relates to a disk drive comprising a rotatable disk having a magnetic recording media formed on a surface of the rotatable disk. The rotatable disk defines a plurality of concentric data tracks. The disk drive further comprises a pivot point positioned adjacent the rotatable disk wherein the pivot point defines an axis. The disk drive further comprises a rotatable pivot assembly positioned on the pivot point so as to rotate about the axis defined by the pivot point. The disk drive further comprises a first actuator having a first transducer coupled to the pivot assembly so as to be rotatable about the axis. The first actuator extends over the surface of the rotatable disk such that rotation of the pivot assembly results in movement of the first transducer over the surface of the rotatable disk such that the first transducer can be positioned adjacent selected data tracks. The disk drive further comprises a first coil that is disposed with respect to the first actuator so as to induce movement of the first actuator and the first transducer with respect to the surface of the disk. The disk drive further comprises a second actuator having a second transducer coupled to the pivot assembly so as to be rotatable about the axis. The second actuator extends over the surface of the rotatable disk such that rotation of the pivot assembly results in movement of the second transducer over the surface of the rotatable disk such that the second transducer can be positioned adjacent selected data tracks. The disk drive further comprises a second coil that is disposed with respect to the second actuator so as to induce movement of the second actuator and the second transducer with respect to the surface of the disk. The disk drive further comprises a mechanical interconnect structure that couples the first and second actuators so as to permit limited relative movement of the first and second actuators such that when the pivot assembly is rotated to a first angular position with the first transducer in a first position adjacent a first selected data track and the second transducer is in a second position adjacent a second selected data track, the first transducer can be moved by the first coil to a third position adjacent a third selected data track without moving the second transducer from the second selected data track.

In one embodiment, the second actuator is coupled to the pivot assembly by the mechanical interconnect structure thereby coupling the first and second actuators. The first and second actuators are influenced by a common vibration associated with the pivot assembly. The disk drive comprises one or more disks wherein each disk defines a top surface and a bottom surface. Each of the first and second actuators comprises at least one arm. At least one transducer is disposed on each of the at least one arm and the at least one arm of the first actuator is arranged with respect to the at least one arm of the second actuator in an alternating manner such that the alternating arms are arranged in an interleaving manner with respect to the one or more disks.

In one embodiment, the disk drive comprises two disks. The first actuator comprises two arms and wherein the second actuator comprises one arm interposed between the two arms of the first actuator. In another embodiment, the disk drive comprises three disks. The first actuator comprises two arms and wherein the second actuator comprises two arms that alternate with the two arms of the first actuator.

In one embodiment, the pivot assembly comprises a cylindrical member having a cylindrical axis that is substantially co-axial with the axis defined by the pivot point. The cylindrical member is adapted to allow mounting of the first and second actuators such that the first and second actuators are mechanically coupled. The mechanical interconnect structure is a spring member that spring couples the first and second actuators. The spring member comprises a plurality of flex sections wherein each flex section is a vertically oriented panel with a first edge attached to a portion of the first actuator and a second edge attached to a portion of the second actuator. The first and second edges are two opposing edges. The flex springs allow relative motion of the first and second actuators in a first mode while resisting other modes of the relative motion.

In one embodiment, the first and second edges of the flex section are inner and outer edges that attach to the first and second actuators respectively. The spring member comprises four flex sections distributed substantially evenly circumferentially so as to provide symmetry about the axis defined by the pivot. The symmetry of the arrangement of the flex sections inhibits non-rotational relative motion between the first and second actuators. The flex sections allow a limited spring-coupled rotational relative motion between the first and second actuators.

The spring member acquires and stores potential energy as the first and second actuators undergo relative rotational displacement. The spring member releases the stored potential energy at a selected instance so as to facilitate subsequent rotational relative motion of the first and second actuators. In one embodiment, each of the first and second actuators has a reduced inertia thereby allowing greater acceleration for a given applied power.

In one embodiment, the spring member allows the first transducer to begin moving in a seek operation while the second transducer is performing a disk data transfer on a selected data track. Separate movements of the first and second actuators reduces a dead time during which disk data transfer is not being performed. The dead time is substantially zero for seek operations involving seek lengths less than a selected distance. In one embodiment, controlling of the motion of the first and second actuators is performed so as to utilize the oscillatory property of the spring member thereby enhancing the controlling effect on the motion of the first and second actuators.

Another aspect of the invention relates to a disk drive comprising a rotatable disk having a magnetic recording media formed on a surface of the rotatable disk wherein the rotatable disk defines a plurality of concentric data tracks. The disk drive further comprises a first actuator having a first transducer and a first coil mounted to a pivot assembly so as to be rotatable about an axis defined by the pivot assembly wherein the first coil induces movement of the first actuator. The disk drive further comprises a second actuator having a second transducer and a second coil mounted on the pivot assembly so as to be rotatable about the axis defined by the pivot assembly wherein the second coil induces movement of the second actuator. The disk drive further comprises a spring member that interconnects and provides a spring coupling between the first and second actuators such that motion of one actuator affects the other actuator. The spring coupling allows the spring member to acquire spring potential energy during a first relative motion of the first and second actuators and release at least a selected portion of the acquired spring potential energy during a second relative motion thereby increasing the rate at which the second relative motion occurs and wherein the spring coupling involves a force that is mutual between the two actuators and generally isolated therebetween such that effects of the force on other parts of the disk drive is reduced.

The spring coupling provided by the spring member allows one of the two actuators to be controlled predictably in response to motion of the other actuator. In one embodiment, the first actuator moves while the second actuator remains over a selected data track. The second actuator is controlled to compensate for the spring member acquiring the spring potential energy thereby allowing the first transducer to initiate a seek operation while the second transducer is performing a disk data transfer. Mechanical disturbance experienced by one actuator is transferred to the other actuator predictably via the spring coupling thereby allowing the coupled mechanical disturbance to be compensated in both actuators in a simplified manner.

In one embodiment, the spring member includes a structure that allows relative motion of the first and second actuators in a first mode while resisting other modes of the relative motion. The spring member allows a limited range of rotational relative motion between the first and second actuators about the axis defined by the pivot assembly wherein the spring member also inhibits non-rotational relative motions between the first and second actuators. The spring member comprises a plurality of flex sections wherein each flex section is a vertically oriented panel with a first edge attached to a portion of the first actuator and a second edge attached to a portion of the second actuator. The first and second edges are two opposing edges.

In one embodiment, the first and second edges of the flex section are inner and outer edges that attach to the first and second actuators respectively. The spring member comprises four flex springs distributed substantially evenly circumferentially so as to provide symmetry about the axis defined by the pivot wherein the symmetry of the arrangement of the flex springs inhibits non-rotational relative motion between the inner and outer portions.

The spring member acquires and stores potential energy as the first and second actuators undergo relative rotational displacement. The spring member releases the stored potential energy at a selected instance so as to facilitate subsequent rotational relative motion of the first and second actuators. In one embodiment, each of the first and second actuators has a reduced inertia thereby allowing greater acceleration for a given applied power. The spring member allows the first transducer to begin moving in a seek operation while the second transducer is performing a disk data transfer on a selected data track. Separate movements of the first and second actuators reduces a dead time during which disk data transfer is not being performed. The dead time is substantially zero for seek operations involving seek lengths less than a selected distance. In one embodiment, controlling of the motion of the first and second actuators is performed so as to utilize the oscillatory property of the spring member thereby enhancing the controlling effect on the motion of the first and second actuators.

Another aspect of the invention relates to a method of performing a seek operation in a hard disk drive comprising a rotatable disk having a magnetic recording media, and an actuator assembly that includes a first transducer mounted on a first rotatable actuator and a second transducer mounted on a second rotatable actuator. The method comprises initiating movement of the first actuator at time T0 while maintaining the second transducer at a first location on the disk to perform a disk data transfer. The resulting relative motion of the first and second actuators causes an interaction of the first and second actuators wherein the interaction causes some of kinetic energy of the relative motion to be stored as potential energy. The method further comprises terminating the disk data transfer of the second transducer at the first location at time T1 and initiating movement of the second actuator wherein at least a portion of the potential energy stored as a result of the interaction of the first and second actuators is converted into kinetic energy of the second actuator thereby increasing the rate of the second actuator's movement.

In one implementation, initiating movement of the first actuator comprises initially supplying the first actuator with a substantially full power available to both actuators so as to cause an increased acceleration of the first actuator. The increased acceleration of the first actuator reduces duration of first actuator's movement. Maintaining the second transducer at the first location while the first actuator is moving comprises supplying the second actuator with controlled current to compensate for interaction between the first and second actuators.

The interaction between the first and second actuators is a spring-coupled interaction. Initiating movement of the second actuator comprises releasing the second actuator by stopping the controlled power thereby allowing the spring-coupled second actuator to be accelerated along with the first actuator. The spring coupling reduces duration of the second actuator's movement.

In another implementation, the method of performing a seek operation further comprises stopping the first actuator and performing a disk data transfer with the first transducer while the second actuator is still in motion. Switching of the second transducer to the first transducer as the disk operating transducer reduces the dead time during which disk data transfer is not being performed. The dead time is substantially zero for seek operations involving seek lengths less than a selected distance. In one implementation, stopping the first actuator comprises supplying the first actuator with a substantially full power available to both actuators so as to cause an increased deceleration of the first actuator.

In one implementation, the method of performing a seek operation further comprises stopping the first actuator and utilizing the spring member to facilitate stopping of the second actuator wherein the second transducer performs a disk data transfer after the second actuator has stopped. In one implementation, stopping the second actuator comprises controlling the deceleration of the first and second actuators such that oscillatory motion between the two actuators due to the spring interaction enhances the effects of the controlled deceleration.

DETAILED DESCRIPTION OF THE PREFERRED EMBODIMENT

Figure 1A:
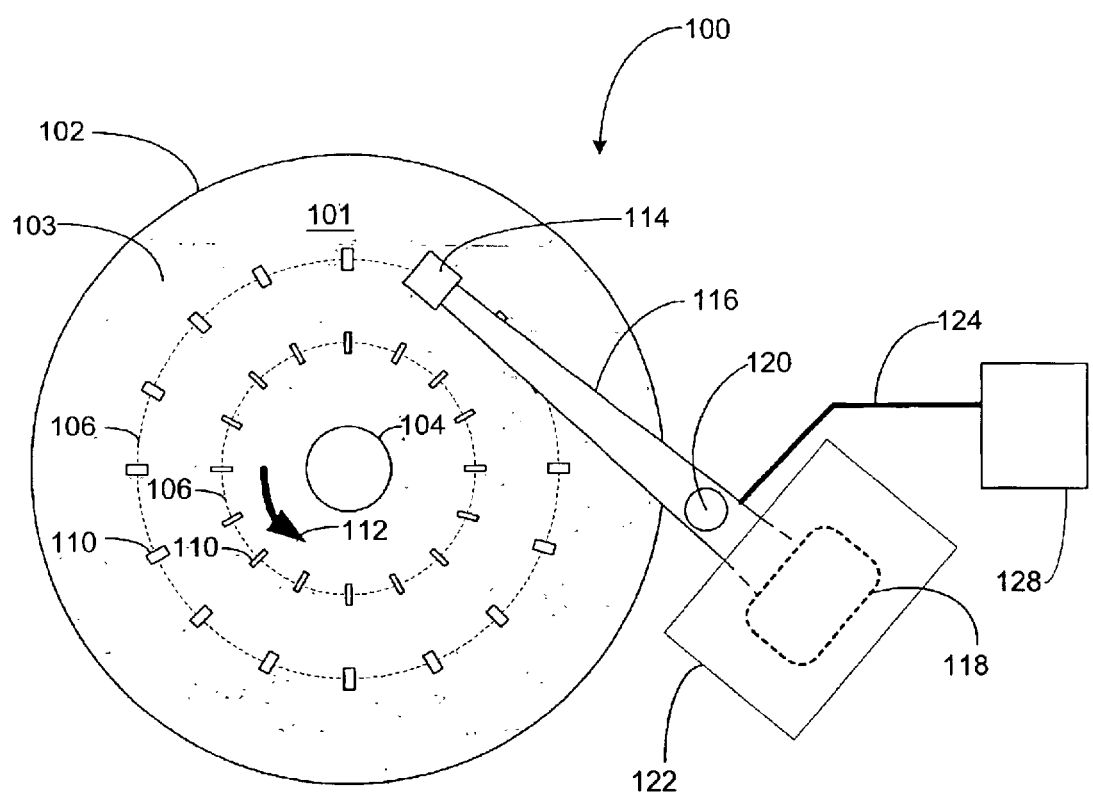
FIG. 1A illustrates a top view of a typical prior art hard disk drive.

Reference will now be made to the drawings wherein like numerals refer to like parts throughout. FIG. 1A schematically illustrates an exemplary disk drive 100 of the prior art for storing information. The disk drive 100 includes one or more disks 102 (also called platters) that have a magnetic media 103 formed on the surfaces 101 of the disks 102. The magnetic media 103 is programmable such that application of an external magnetic field results in a change of the magnetic state of the media which permits the magnetic media 103 to be selectively magnetized to store data. The disks 102 are typically organized into a plurality of concentric magnetic tracks 106 which include servo bursts 110 that are arranged so as to be equally spaced from an axis of a spindle 104 about which the disk 102 rotates. The servo bursts 110 on a given track 106 are spaced circumferentially in a periodic manner and they provide positional information used by a voice coil motor (VCM) servo system during reading and writing operations, and seeking and settling operations, in a manner known in the art.

The disk drive 100 further comprises a transducer 114 mounted on an actuator 116 that rotates about a pivot point defined by a pivot assembly due to a controlled torque applied by a VCM 122. The pivot assembly typically comprises a pivot bearing 120. A signal bus 124 interconnects the transducer 114 and the VCM 122 to a controller 128 such that the controller 128 can control the movement of the actuator 116 in a manner well known in the art. Furthermore, the controller 128 sends and receives signals to and from the transducer 114 so as to permit the transducer to read, write, and erase information contained on the disk 102.

In operation, the disk 102 rotates about the axis of the spindle 104 at selected angular speed such that the surface 101 of the disk 102 moves relative to the transducer 114. The transducer's radial position on the disk 102 is changeable by the rotation of the actuator 116 so as to be able to position the transducer 114 on a desired data track 106. The transducer's radial and circumferential position on the disk 102 is determined by reading of the information contained in the servo bursts 110 in a manner well known in the art. Once the transducer 114 is positioned on the desired data track 106 within desirable limits, data can be written to or read from a circular arc between the servo bursts 110.

FIG. 1A further illustrates a coil 118 located at the end of the actuator 116, opposite from the transducer 114. As is well known in the art, when a current is passed through the coil 118, the coil forms an electromagnet that interacts with an existing magnetic field from a source such as a permanent magnet. The coil 118 and the permanent magnet are configured such that passing of the current in the coil 118 in one direction causes the actuator 116 to rotate in a first direction. When the current is passed through the coil 118 in the opposite direction, the actuator 116 rotates in a second direction that is substantially opposite from the first direction.

Figure 1B:
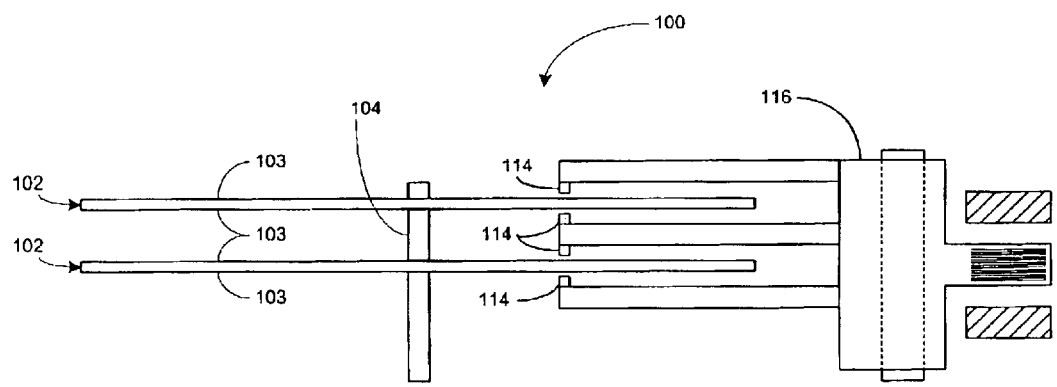
FIG. 1B illustrates a side view of the prior art hard disk drive.

FIG. 1B illustrates a side view of the exemplary disk drive 100 of the prior art, showing that the disk drive 100 may have more than one disk 102 mounted on a common spindle 104. Associated with each disk surface 101 is a transducer 114 mounted to a common actuator 116. Thus, the disks 102 rotate in unison, and the transducers 114 move in unison relative to the rotating disks 102.

Figure 2:
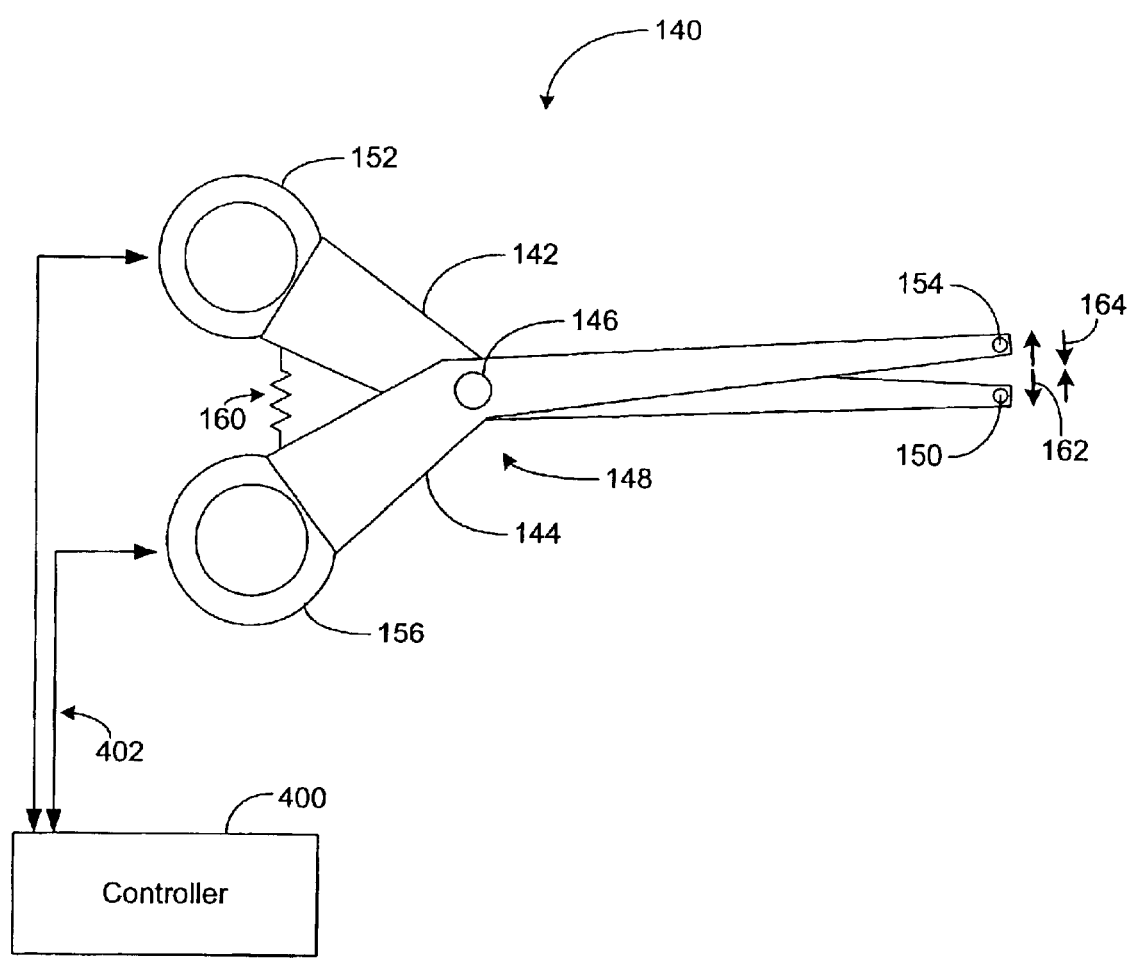
FIG. 2 illustrates a symbolic functional representation of a split actuator.

FIG. 2 illustrates a functional schematic diagram of one embodiment of a split actuator 140. The split actuator 140 comprises a first actuator 142 coupled to a second actuator 144. In one embodiment, the first and second actuators 142 and 144 are rotatably mounted on a pivot bearing 146 such that the first and second actuators 142, 144 rotate about a common axis defined by the pivot bearing 146 in a manner described below. The first actuator 142 comprises a first transducer 150 disposed thereon and a first coil 152 that drives movement of the first actuator 142. Similarly, the second actuator 144 comprises a second transducer 154 disposed thereon and a second coil 156 that drives movement of the second actuator 144.

FIG. 2 further illustrates a controller 400 interconnected to the first and second actuators 142 and 144 by a bus 402. In one embodiment, the function of the controller 400 includes controlling movements of the first and second actuators 142 and 144.

Because the first and second actuators 142, 144 share a common axis of rotation about the pivot bearing 146, the first and second actuators 142, 144 may move in a first relative direction 162 or a second relative direction 164. Specifically, the first relative direction 162 may be defined as the first and second transducers 150, 154 moving away from each other, and the second relative direction 164 may be defined as the first and second transducers 150, 154 moving towards each other. Thus, for example, if the first transducer 150 is stationary with respect to the disk and the second transducer 154 moves away from the first transducer 150, then the first and second actuators 142, 144 are moving in the first relative direction 162.

As schematically indicated by a spring in FIG. 2, the split actuator 140 further comprises a mechanical coupling 160 that couples the first and second actuators 142, 144. One aspect of the split actuator relates to the split actuator 140 being able to store a portion of the energy associated with the relative movement of the first and second actuators 142, 144 in the mechanical coupling 160, such that the stored energy can be utilized to aid the subsequent relative movement of the first and second actuators 142, 144. As described below in greater detail, the combination of dual actuators and energy storing capability permits the split actuator 140 to advantageously perform various seek operations with either reduced or substantially hidden seek times. Another aspect of the split actuator relates to the structure of the mechanical coupling that permits overcoming of at least some of the problems associated with dual actuators.

Splitting an actuator into two separate structures and coupling them allow aforementioned advantages to be implemented in a manner described below. In one embodiment, for example, each of the two split actuators has approximately half the inertia as the unsplit actuator because each actuator needs to support half the number of transducers. The VCM torque constant can correspondingly be reduced by approximately half while maintaining a specified level of angular acceleration for the split actuators. As a consequence, coil dimensions and magnet size for each coil can also be reduced. Alternatively, since the specified level of acceleration can be achieved by approximately half of the original current, if the VCM torque constant is left unchanged from that of a standard actuator, a full original current can, if desired, provide one split actuator with approximately twice the specified acceleration of a standard actuator if the desired seek distance is small.

The split actuator implementation described herein addresses the drawbacks referred to in the Description of the Related Art section in a manner described below. In particular, the structure (and advantages derivable therefrom) of the mechanical coupling between the first and second actuators is described.

Figure 3A:
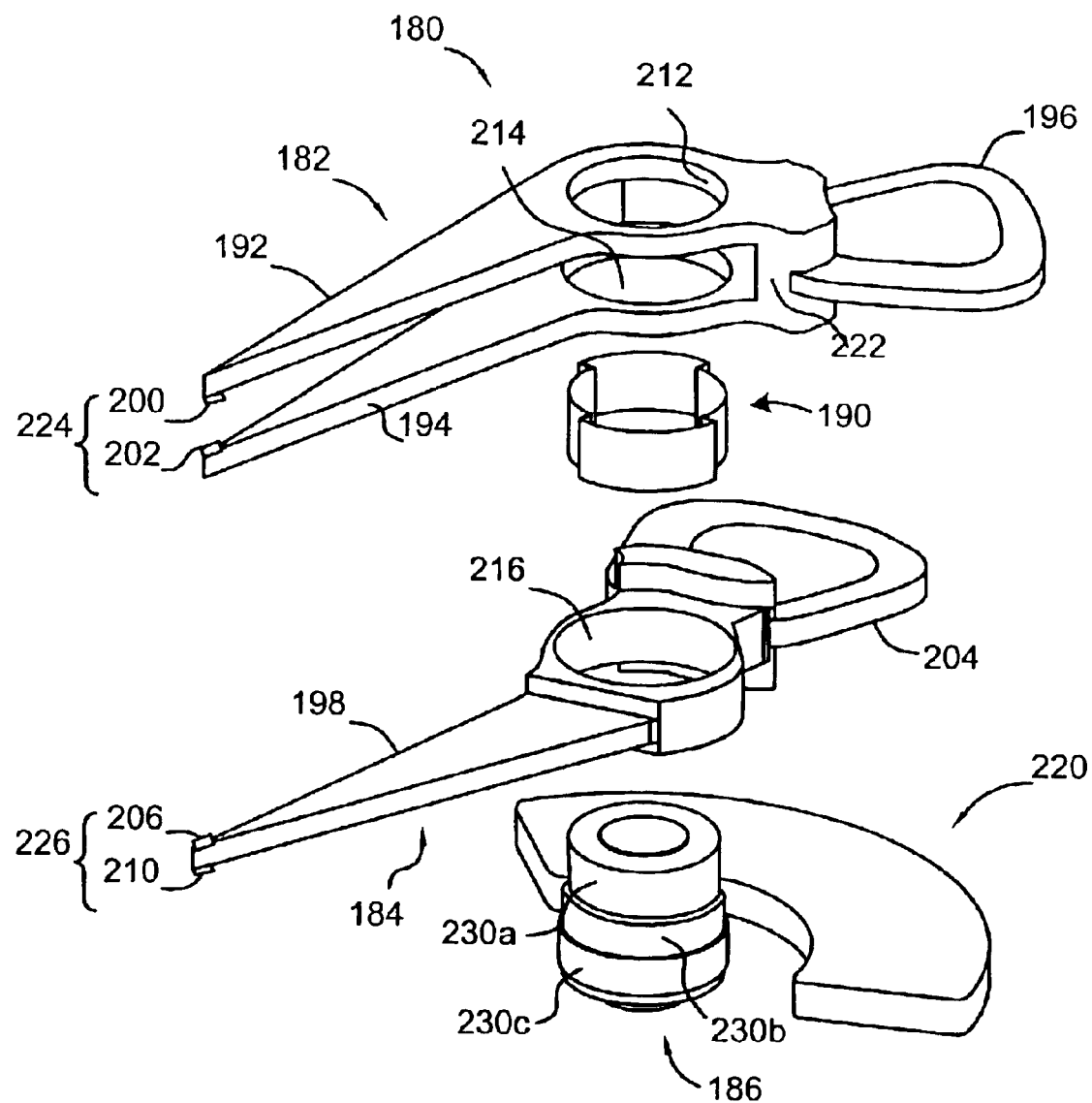
FIG. 3A illustrates an isolated exploded view of one embodiment of the split actuator comprising a combination of a first actuator and a second actuator wherein both are mounted on a common pivot bearing.
Figure 3B:
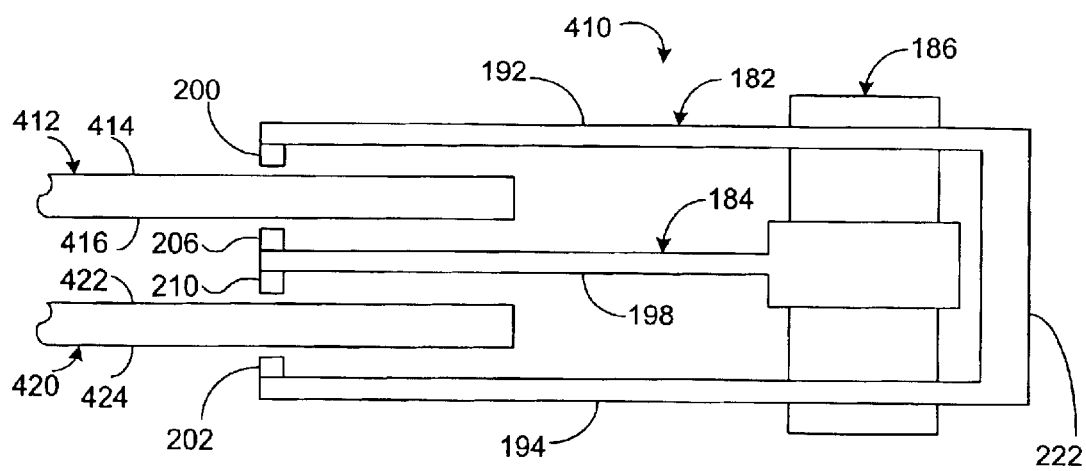
FIG. 3B illustrates a side view of a two platter disk drive in which the split actuator of FIG. 3A may be utilized.

FIGS. 3A–B illustrate a split actuator 180 that represents one possible embodiment of the coupled split actuator described above in reference to FIG. 2. The split actuator 180 is configured to be used with a two-platter disk drive comprising a top platter and a bottom platter. The top platter defines a top surface and a bottom surface, and the bottom platter similarly defines a top surface and a bottom surface. It will be appreciated that while the exemplary configuration of the split actuator is described in context of the two platter disk drive, the implementation of the split actuator is not limited to such a disk drive. The split actuator may be adapted and implemented in disk drives with any number of platters without departing from the spirit of the invention. As an example, a three platter disk drive and a modified split actuator is described below in reference to FIG. 3C.

FIG. 3A illustrates an exploded view of the split actuator 180, showing that the split actuator 180 comprises a first actuator 182 and a second actuator 184 mountable on a common pivot bearing 186. The first actuator 182 defines apertures 212 and 214 that are sized so as to permit mounting of the first actuator 182 on the common pivot bearing 186 in a manner described below. The second actuator 184 defines an aperture 216 that is sized so as to permit mounting of the second actuator 184 on the common pivot bearing 186 in a manner described below.

In one embodiment, the common pivot bearing 186 comprises a single outer cylindrical sleeve with two inner ball bearing races (not shown) spaced vertically on a common axle that is fixedly mounted to a base plate of the disk drive. Thus, outer surface of the pivot bearing 186 is free to rotate about the pivot axis with negligible friction. The outer surface comprises a cylindrical shaped structure having a top portion 230a, a middle portion 230b, and a bottom portion 230c. The top portion 230a has a first diameter, the middle portion 230b has a second diameter that is larger than the first diameter, and the bottom portion 230c has a third diameter that is larger than the second diameter. The top and bottom portions 230a, c are dimensioned to engage the first actuator 182 in a manner described below. The middle portion 230b is dimensioned to engage a spring member 190 in a manner described below, wherein the spring member 190 further engages the second actuator 184 in a manner also described below.

The first actuator 182 comprises a first and a second arm 192, 194 with a proximal end and a distal end. The aperture 212 is located at the proximal end of the first arm 192, and the aperture 214 is located at the proximal end of the second arm 194. The aperture 212 is dimensioned with respect to the first diameter of the top portion 230a of the common pivot bearing 186 so as to permit, in a manner described below, substantially rigid attachment of the first arm 192 to the top portion 230a of the common pivot bearing 186. Similarly, the aperture 214 is dimensioned with respect to the third diameter of the bottom portion 230c of the common pivot bearing 186 so as to permit, in a manner described below, substantially rigid attachment of the second arm 194 to the bottom portion 230b of the common pivot bearing 186. Consequently, the first actuator 182 is fixedly coupled to the common pivot bearing 186.

The proximal ends of the first and second arms 192, 194 of the first actuator 182 are further interconnected by a connecting member 222. The connecting member 222 is further fixedly connected to a first coil 196.

Disposed at the distal end of the first arm 192 is a transducer 200 arranged to face downward so as to permit interaction with the top surface of the top platter. Disposed at the distal end of the second arm 194 is a transducer 202 arranged to face upward so as to permit interaction with the bottom surface of the bottom platter. The transducers 200 and 202 are associated with the first actuator 182, and are collectively referred to herein as a first transducer 224. The manner in which the transducers 200 and 202 are positioned relative to the surfaces of the two platters is described below in greater detail in reference to FIG. 3B.

The second actuator 184 comprises an arm 198 with a proximal end and a distal end. The aperture 216 is located at the proximal end of the arm 198. The aperture 216 is dimensioned to permit, in a manner described below, substantially rigid attachment of the second actuator 184 to an outer portion of spring member 190. An inner portion of the spring member 190 is dimensioned with respect to the second diameter of the middle portion 230b of the common pivot bearing 186 so as to permit, in a manner described below, substantially rigid attachment of the inner portion of the spring member 190 to the middle portion 230b of the common pivot bearing 186. As such, motion of the common pivot bearing 186 is transferred to the second actuator 184 by the spring member 190. Since the first actuator 182 is rigidly mounted to the common pivot bearing 186, the spring member 190 in effect spring couples the first and second actuators 182, 184. Structure and function of the spring member 190, as well as advantages obtained therefrom, are described below in greater detail.

The proximal end of the arm 198 of the second actuator 184 is connected to a second coil 204 in a manner described below. Disposed at the distal end of the arm 198 is a transducer 206 arranged to face upward, and a transducer 210 arranged to face downward. Thus, the transducer 206 is oriented to interact with the bottom surface of the top platter, and the transducer 210 is oriented to interact with the top surface of the bottom platter. The transducers 206 and 210 are associated with the second actuator 184, and are collectively referred to herein as a second transducer 226. The manner in which the transducers 206 and 210 are positioned relative to the surfaces of the two platters is described below in greater detail in reference to FIG. 3B.

The first and second actuators 182, 184 are coupled by the spring member 190 such that when the spring member 190 is in a relaxed configuration (at rest), the first and second transducers 224, 226 are, at a selected relative orientation. One possible selected relative orientation places the first and second transducers 224 and 226 at a substantially same radial position with respect to the platter spindle (104 in FIGS. 1A and B). It will be appreciated, however, that any number of relative orientation may be selected without departing from the spirit of the invention.

As further illustrated in FIG. 3A, the first and second coils 196, 204 are configured to interact with at least one magnet 220 so as to provide torque to the first and second actuators 182, 184. The first and second coils 196 and 204 are configured relative to their respective arms 192 (or 194) and 198 such that when the two actuators 182, 184 are mounted on the common pivot bearing 186, a first plane defined by the first coil 196 is substantially coplanar with a second plane defined by the second coil 204. As such, the first and second coils 196, 204 do not overlap and adjoining sections of the first and second coils 196, 204 are separated from each other by a selected separation distance when the spring member 190 is relaxed. This gap allows full current in both coils to fully flex the spring member 190 without causing the coils 196, 204 to come in contact with each other during most disk drive operations. The spring member 190 is configured, in a manner described below, to yield a selected spring constant to permit small, controlled relative movement between the first and second actuators 182, 184.

Although the first and second coils described above in reference to FIG. 3A are oriented horizontally, it will be appreciated that other orientations of the coils can be implemented in the split actuator without departing from the spirit of the invention. For example, vertically oriented coils in conjunction with properly adapted magnet(s) may be utilized in the split actuator design.

Although the first and second actuators 182, 184 are shown with the second actuator 184 suspended by spring member 190 and the first actuator 182 mounted fixedly to the cylindrical shaped post, it will be appreciated that the reverse configuration can also be used without departing from the spirit of the invention. The first actuator 182 can have a different dimension for apertures 212, 214 such that the first actuator 182 is suspended from the pivot bearing 186 by a pair of spring members with respect to top and bottom portions of the pivot bearing 186, while diameter of the aperture 216 of the second actuator 184 can be selected to allow fixed mounting of the second actuator 184 to the middle portion of the pivot bearing 186.

FIG. 3B illustrates a side view of a two-platter disk drive 410 comprising the split actuator interleaved with two platters—a top platter 412 and a bottom platter 420. The top platter 412 defines a top surface 414 and a bottom surface 416. The bottom platter 420 defines a top surface 422 and a bottom surface 424. As previously described, the split actuator comprises the first actuator 182 and the second actuator 184 mounted on the common pivot bearing 186, wherein the spring member (not shown) couples the first and second actuators 182, 184. The first actuator 182 comprises the first arm 192 and the second arm 194. Disposed on the first arm 192 is the transducer 200 oriented to face downward, and disposed on the second arm 194 is the transducer 202 oriented to face upward. Thus as seen in FIG. 3B, the transducer 200 of the first arm 192 interacts with the top surface 414 of the top platter 412. The transducer 202 of the second arm 194 interacts with the bottom surface 424 of the bottom platter 420. As previously described, the first and second arms 192, 194 of the first actuator 182 are fixedly attached by the connecting member 222.

The second actuator 184 comprises the arm 198 interposed between the first and second arms 192, 194 of the first actuator 182, and also between the top and bottom platters 412, 420. Disposed on the arm 198 are transducers 206 and 210. The transducer 206 is oriented to face upward so as to interact with the bottom surface 416 of the top platter 412, and the transducer 210 is oriented to face downward so as to interact with the top surface 422 of the bottom platter 420. Thus in the two-platter disk drive illustrated in FIG. 3B, the first actuator 182 services two of the four surfaces while the second actuator 184 services the remaining two surfaces.

Figure 3C:
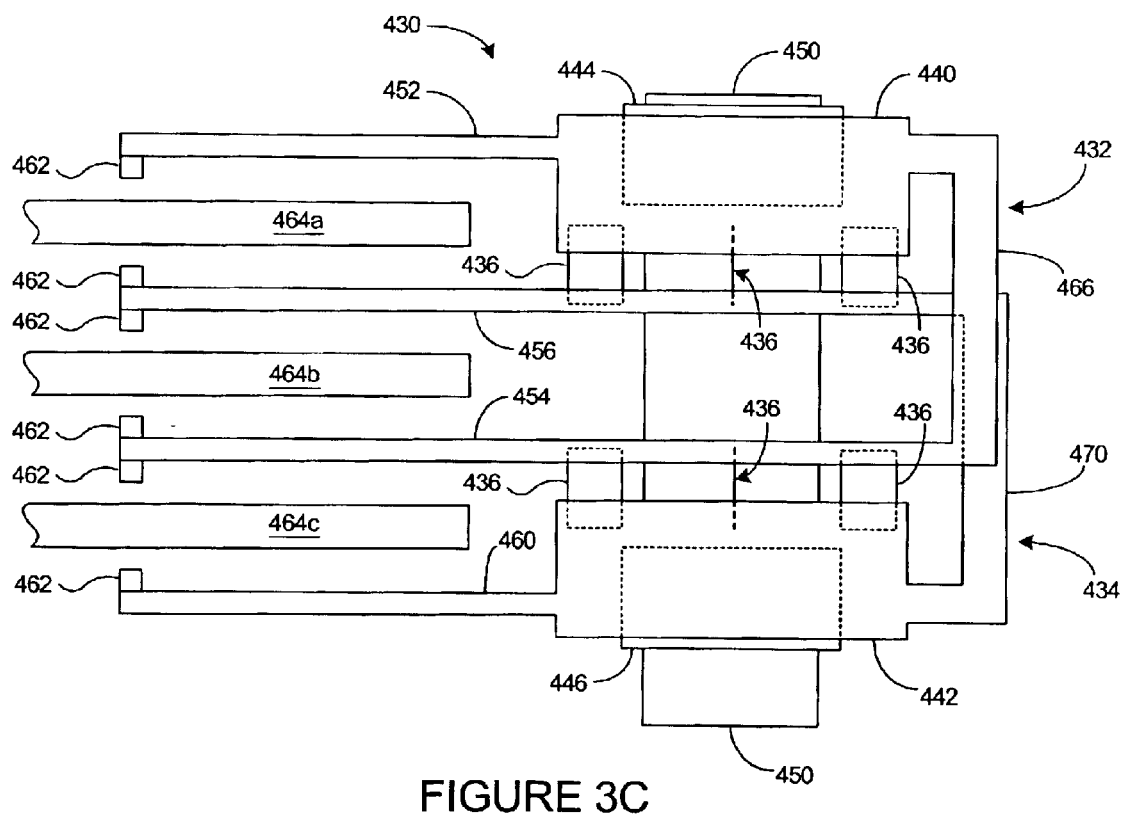
FIG. 3C illustrates a side view of a multiple platter disk drive in which another embodiment of the split actuator may be utilized.

As referred to above, use of the split actuator is not limited to the two-platter disk drives, and can be implemented in multiple-platter systems without departing from the spirit of the invention. As an example of how the split actuator may be adapted to service multiple-platter systems, FIG. 3C illustrates a side view of a three-platter disk drive comprising a top platter 464a, a middle platter 464b, and a bottom platter 464c. Each of the three platters 464a–c defines a top surface and a bottom surface with magnetic media formed thereon. The three-platter disk drive further comprises a modified split actuator 430 having a first actuator 432 and a second actuator 434. The first and second actuators 432, 434 are mounted on a pivot bearing 450 in a manner described below. Furthermore, the first and second actuators 432, 434 are spring coupled by a plurality of flex sections 436 in a manner described below.

The first actuator 432 comprises a mounting member 440 that mounts the first actuator 432 to the pivot bearing 450. In particular, the mounting member 440 is adapted to be mounted to the pivot bearing 450 via a first bearing 444. The first actuator 432 further comprises a first arm 452 that is fixedly attached to the mounting member 440 and extends laterally towards the platters. The first actuator 432 further comprises a second arm 454 interconnected to the mounting member 440 by a connecting member 466. The connecting member 466 is fixedly attached to the mounting member 440, and is also fixedly attached to the second arm 454. Thus, the first and second arms 452, 454 are interconnected to each other in a fixed manner. The second arm 454 extends laterally towards the platters, and is generally parallel to the first arm 452.

Similarly, the second actuator 434 comprises a mounting member 442 that mounts the second actuator 434 to the pivot bearing 450. In particular, the mounting member 442 is adapted to be mounted to the pivot bearing 450 via a second bearing 446. The second actuator 434 further comprises a first arm 460 that is fixedly attached to the mounting member 442 and extends laterally towards the platters. The second actuator 434 further comprises a second arm 456 interconnected to the mounting member 442 by a connecting member 470. The connecting member 470 is fixedly attached to the mounting member 442, and is also fixedly attached to the second arm 456. Thus, the first and second arms 460, 456 are interconnected to each other in a fixed manner. The second arm 456 extends laterally towards the platters, and is generally parallel to the first arm 460. It will be understood that the connecting member 470 of the second actuator 434 is illustrated with a slight lateral offset from the connecting member 466 of the first actuator 432 for illustrative purpose. Furthermore, coils for the first and second actuators 432, 434 are not shown as the purpose of FIG. 3C is to illustrate interleaving of the arms of the two actuators and spring coupling therebetween.

As seen in FIG. 3C, the interleaved four arms of the two actuators are positioned relative to the three platters such that each of the three platters is interposed between two arms. As such, the top surface of the top platter 464a is serviced by a transducer 462 disposed on the first arm 452 of the first actuator 432. The bottom surface of the top platter 464a and the top surface of the middle platter 464b are serviced by transducers 462 disposed on the second arm 456 of the second actuator 434. The bottom surface of the middle planer 464b and the top surface of the bottom platter 464c are serviced by transducers 462 disposed on the second arm 454 of the first actuator 432. The bottom of the bottom platter 464c is serviced by a transducer 464 disposed on the first arm 460 of the second actuator 434.

The spring coupling of the first and second actuators 432, 434 is achieved by the plurality of flex sections 436. In one embodiment, first ends of four flex sections 436 (three shown and one hidden from view) are embedded into the mounting member 440 of the first actuator 432, and second ends of the four flex sections 436 are embedded into the second arm 456 of the second actuator 434. Similarly, first ends of additional four flex sections 436 (again, three shown and one hidden from view) are embedded into the mounting member 442 of the second actuator 434, and second ends are embedded into the second arm 454 of the first actuator 434. Thus, when the first and second actuators 432, 434 undergo relative rotational motion about the pivot bearing 450, the eight flex sections 436 flex thereby providing the spring coupling.

The top four flex sections 436 are substantially evenly distributed circumferentially such that a flex section is angularly separated from an adjacent flex section by approximately 90 degrees. The bottom four flex sections 436 are arranged in a similar manner. As described below in greater detail, having the flex sections 436 oriented vertically in the foregoing manner provides structural advantages and selectivity of transfer of motion between the two actuators. Furthermore, by having the top and bottom sets of the flex sections arranged in a substantially symmetric manner relative to each other, load imbalance associated with any given flex section is substantially cancelled by its symmetric counterpart.

It will be appreciated that use of the two sets of four flex sections represent only one possible embodiment in the spring coupling between the first and second actuators. Other numbers of flex sections may be implemented in the spring coupling without departing from the spirit of the invention. Furthermore, it will be appreciated that the two arms per actuator as illustrated in FIG. 3C is not intended to limit the number of arms that each actuator can have. From the configurations of two- and three-platter drives described above in reference to FIGS. 3B–C, it is readily apparent that the split actuator can be adapted to service number of platters that is more or less than the two- and three-platters without departing from the spirit of the invention.

Figure 3D:
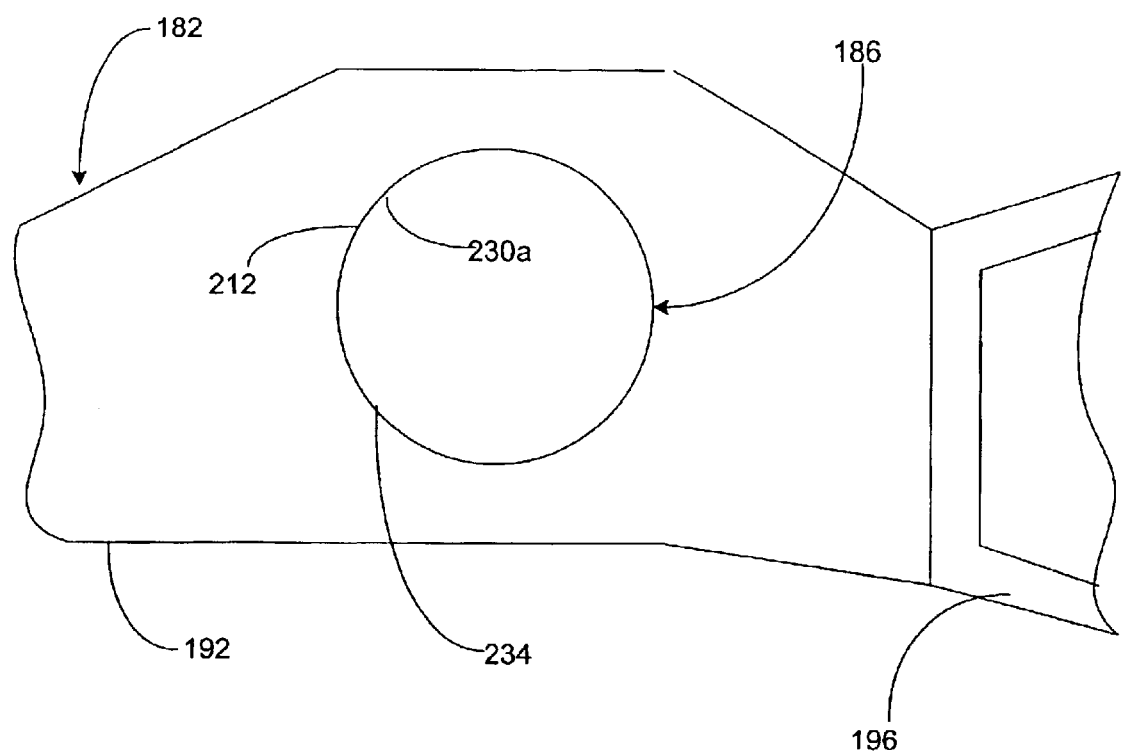
FIG. 3D illustrates a plan view of the first actuator in relation to the common pivot bearing, wherein the first actuator is fixedly mounted to the common pivot bearing.

FIG. 3D illustrates a manner in which the first actuator 182 is attached to the common pivot bearing 186 in a substantially rigid manner. A plan view of the first actuator 182 in relation to the common pivot bearing 186 shows that the aperture 212 of the first arm 192 is selected so as to allow receiving of the top portion 230a of the common pivot bearing 186. Furthermore, the diameter of the aperture 212 and the diameter (the first diameter) of the top portion 230a of the common pivot bearing 186 are selected so as to permit formation of a substantially rigid joint 234 between the first arm 192 and the top portion 230a of the common pivot bearing 186. The substantially rigid joint 234 may be achieved in any number of ways including, by way of example, gluing, welding, or press fitting. While not shown in the plan view of FIG. 3D, second arm 194 (via the aperture 214) is also fixedly attached to the bottom portion 230c of the common pivot bearing 186 in a substantially similar manner.

Figure 3E:
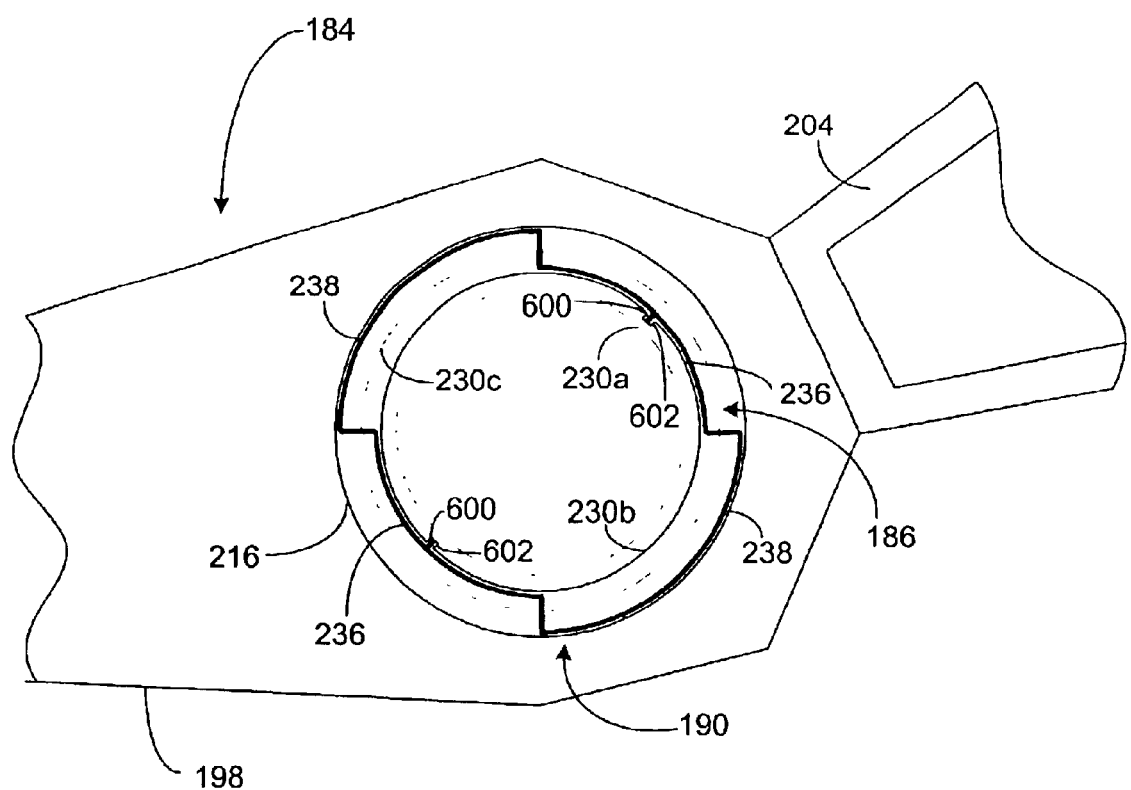
FIG. 3E illustrates a plan view of the second actuator in relation to the common pivot bearing and a spring member, wherein the second actuator is coupled to the common pivot bearing by the spring member so as to spring couple the first and second actuators.

FIG. 3E illustrates a manner in which the second actuator 184 is attached to the common pivot bearing 186. A plan view of the second actuator 184 in relation to the common pivot bearing 186 shows that the spring member 190 is interposed radially between the perimeter of the aperture 216 and the middle portion 230*b* of the common pivot bearing 186. As such, the diameter of the aperture 216 is greater than the diameter (the second diameter) of the middle portion 230*b* of the common pivot bearing 186. The spring member 190, described below in greater detail, is comprised of the outer portion and the inner portion. The inner portion of the spring member 190 is dimensioned with respect to the middle portion 230*b* of the common pivot bearing 186 so as to allow formation of substantially rigid joints 236. The outer portion of the spring member 190 is dimensioned with respect to the aperture 216 to allow formation of substantially rigid joints 238. The substantially rigid joints 236 and 238 may be achieved in any number of ways including, by way of example, gluing or welding, or by spring tension due to the interference fit of the spring member 190 with respect to the dimensions of the aperture 216 and the middle portion 230*b*. In one embodiment, the inner portion of the spring member 190 is embedded into the common pivot bearing during manufacturing of the common pivot bearing. An alternative embodiment includes tabs 600 disposed on the inner portion of the spring member 190 which fit into vertical grooves 602 defined by the pivot bearing and are held in place by spring tension, thereby inhibiting circumferential displacement of the inner portion of the spring member 190 relative to the pivot bearing 186.

As will be described below in greater detail, the inner portion and outer portion of the spring member 190 are spring coupled such that the common pivot bearing 186 is spring coupled to the second actuator 184. Furthermore, since the common pivot bearing 186 is coupled to the first actuator 182 in a substantially rigid manner, the first and second actuators 182 and 184 are in effect spring coupled by the spring member 190. In one embodiment, the spring member 190 is dimensioned to engage the middle portion 230*b* of the common pivot bearing 186, by slipping over the top portion 230*a*. In FIG. 3E, the top and bottom portions 230*a*, 230*c* are depicted by a dashed circles indicating that the diameter of the middle portion 230*b* is between the diameters of the top portion 230*a* and the bottom portion 230*c*.

Figure 3F:
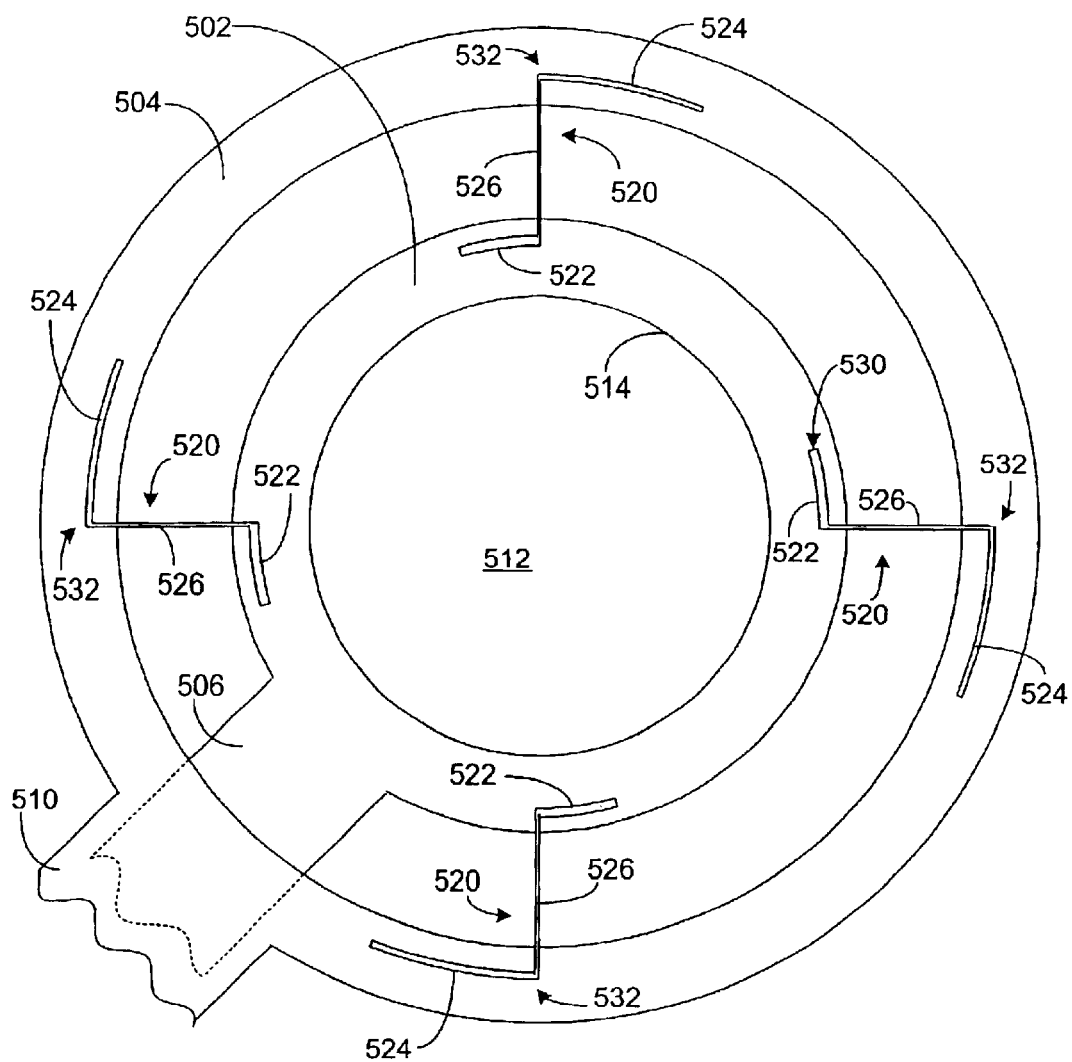
FIG. 3F illustrates a plan view of another embodiment of the actuator wherein the spring member is directly attached to the first and second actuators.

FIG. 3F illustrates an alternate embodiment of mounting of first and second actuators 502 and 504 to a pivot bearing 512, and spring coupling between the first and second actuators 502, 504. The plan view of a portion of the first actuator 502 and a portion of the second actuator 504 mounted on the pivot bearing 512 is intended to show the spring coupling between the two actuators. As such, coils for the first and second actuators 502, 504 are not shown. It will be understood, however, that the coils can be positioned at locations generally opposite (about the pivot bearing) from arms 506 (for first actuator 502) and 510 (for second actuator 510) in a manner that is similar to that described above in reference to FIG. 3A.

The spring coupling comprises four flex springs 520 arranged circumferentially so as to be substantially evenly distributed. The four flex springs 520 collectively form a spring member similar to the spring member 190 described above in reference to FIG. 3E. The structure of the flex spring 520 (and that of the flex springs that make up the spring member 190) is described below in greater detail. Each flex spring 520 comprises a flex section 526 with an inner end and an outer end. The inner end of the flex section 526 is fixedly attached to an inner section 522, and the outer end of the flex section 526 is fixedly attached to an outer section 524. The four inner sections 522 collectively define an inner portion of the spring member, and the four outer sections 524 collectively define an outer portion of the spring member. It will be understood that the spring member having four flex springs 520 is exemplary, and other number of flex springs may be used to form the spring member without departing from the spirit of the invention.

In one embodiment, the inner sections 522 are embedded in the first actuator 502 so as to form a fixed attachment 530 between the first actuator 502 and the inner portion of the spring member. The outer sections 524 are also embedded in the second actuator 504 so as to form a fixed attachment 532 between the second actuator 504 and the outer portion of the spring member. As such, the first and second actuators 502, 504 are spring coupled by the flex sections 526.

The configuration of mounting and spring coupling described above in reference to FIG. 3F facilitates easier assembly in certain situations. In an exemplary mounting process, the uncoupled first and second actuators 502, 504 are mounted on the pivot bearing 512 such that the first actuator 502 forms a fixed attachment 514 with the pivot bearing 512. The flex springs 520 of the spring member are then inserted between the first and second actuators 502, 504 so as to form the fixed attachments 530 and 532. In one embodiment, the first and second actuators 502, 504 define a plurality of grooves that are dimensioned to receive the inner and outer sections 522, 524 of the flex springs 520. The fixed attachments 530 and 532 may be formed by any number of methods, including, by way of example, gluing or welding.

Figure 4B:
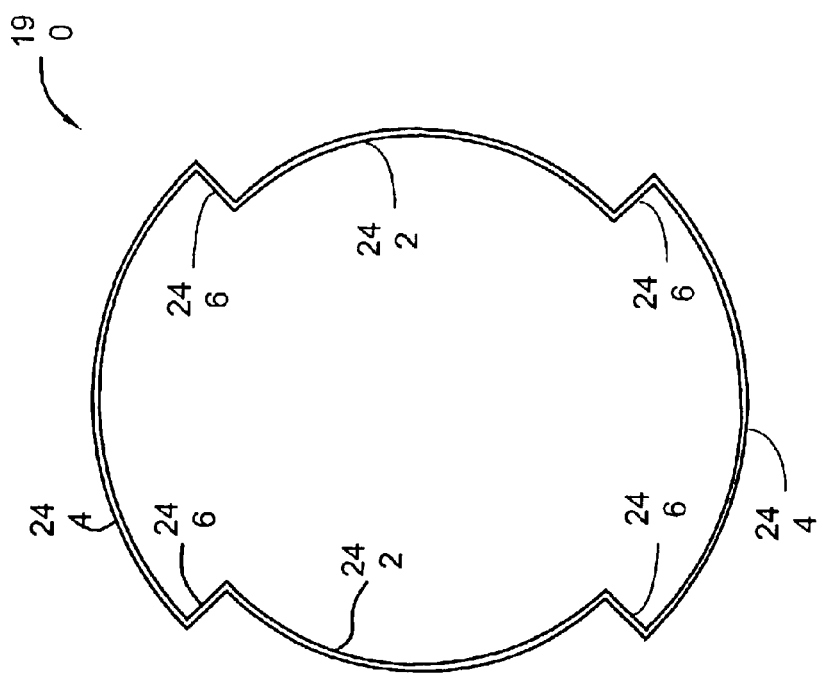
FIG. 4B illustrates a top sectional view of the spring member showing the flex sections that spring couple inner portion and outer portion of the spring member, thereby spring coupling the first and second actuators.
Figure 4A:
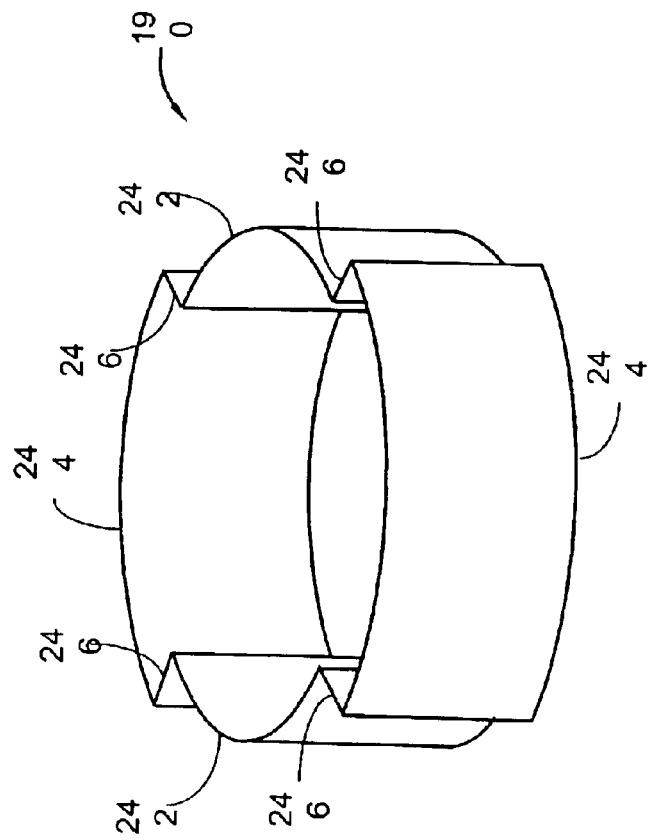
FIG. 4A illustrates an isometric view of the spring member comprising four flex sections arranged circumferentially.

FIGS. 4A–B illustrate isometric and plan views of one embodiment of the spring member 190 described above. In particular, the spring member 190 comprises four flex sections 246 that are vertically oriented and arranged substantially evenly circumferentially about the pivot bearing. Each flex section 246 defines a vertical plane that intersects with the pivot axis defined by the pivot bearing. The spring member 190 further comprises two inner sections 242 and two outer sections 244 arranged circumferentially is an alternating manner. An end of the inner section 242 is interconnected to an end of the circumferentially adjacent outer section 242 by one flex section 246, thereby yielding four such interconnections. The inner sections 242 are contoured to conform to the middle portion 230*b* of the common pivot bearing 186 (FIG. 3E), and the outer sections 244 are contoured to conform to the perimeter of the aperture 216 of the second actuator 184. Specifically, the middle portion 230*b* of the common pivot bearing 186 defines a cylinder; thus each inner section 242 defines an arc with radius of curvature similar to the radius of the middle portion 230*b* of the common pivot bearing 186. Similarly, the aperture 216 is a circular opening; thus each outer section 244 defines an arc with radius of curvature similar to the radius of the aperture 216. The inner sections 242 collectively form the inner portion of the spring member 190, and the outer sections 244 collectively form the outer portion of the spring member 190.

The embodiment of the spring member 190 illustrated in FIGS. 4A–B comprises the four flex sections 246. In principle, a single flex section can perform the spring coupling function of the spring member. It is preferable, however, that the number of flex sections be selected and arranged to provide some form of symmetry about the axis of the common pivot bearing. Any unbalanced load placed on the spring member applies an undesirable torque on the spring member about an axis that is not co-axial with the common pivot bearing's axis.

The four flex sections 246 illustrated in FIG. 4B provide symmetry about the common pivot bearing's axis, meaning that a load placed on one of the flex section is substantially offset by another flex section on the opposite side. By having four such flex sections 246 arranged in the foregoing manner, the load balancing is advantageously achieved in two dimensions of a plane substantially perpendicular to the axis of the common pivot bearing 186.

For the subsequent description of the functional features of the spring member 190, the inner sections 242 are assumed to be rigidly attached to the first actuator 182, and the outer sections 244 are assumed to be rigidly attached to the second actuator 184. Such association of the inner and outer sections to the first and second actuators are based on the foregoing description of the split actuator 180 and the spring member 190 in reference to FIGS. 3–4. Furthermore, the axis of the common pivot bearing 186 is assumed to extend vertically thereby defining a vertical direction in the description below.

As illustrated in FIGS. 4A–B, the spring member 190 comprises the flex sections 246 that couple the first and second actuators. Each flex section 246 in the embodiment illustrated defines a vertically oriented rectangular panel with a top edge, a bottom edge, and inner and outer edges. The inner edge is attached to the end of the inner section 242, and the outer edge is attached to the end of the outer section 244.

As is generally understood in the art, such a structure highly resists certain relative motions between the inner section 242 and the outer section 244 (and thus between the first and second actuators). Relative vertical motion and relative radial motion are two such highly resisted modes of motion. With a single flex section 246 configured in the aforementioned manner, the second actuator (attached to the outer section 244) is able to twist relative to the first actuator (attached to the inner section 242) such that the second actuator's axis of rotation is either not parallel or coaxial to the first actuator's axis of rotation when the second actuator is twisted. However, when four such flex sections 246 are arranged in a symmetric manner, such mode of twisting motion of individual flex section is resisted by the other flex sections. For example, any twisting motion in the flex section that results in displacement of the second actuator's axis of rotation (relative to the first actuator's axis of rotation) along a direction between the two opposing flex sections is inhibited by the other two opposing flex sections due to their aforementioned resistance to relative radial motion.

Thus it will be appreciated that given the configuration of the spring member 190 illustrated in FIGS. 4A and B, representing one possible embodiment, the only mode of relative motion between the first and second actuators that is not substantially inhibited is a relative rotational motion about the pivot axis. The relative rotational motion between the first and second actuators is spring coupled, wherein the spring coupling comprises flexing of the four flex sections 246 of the spring member 190.

Figure 5:
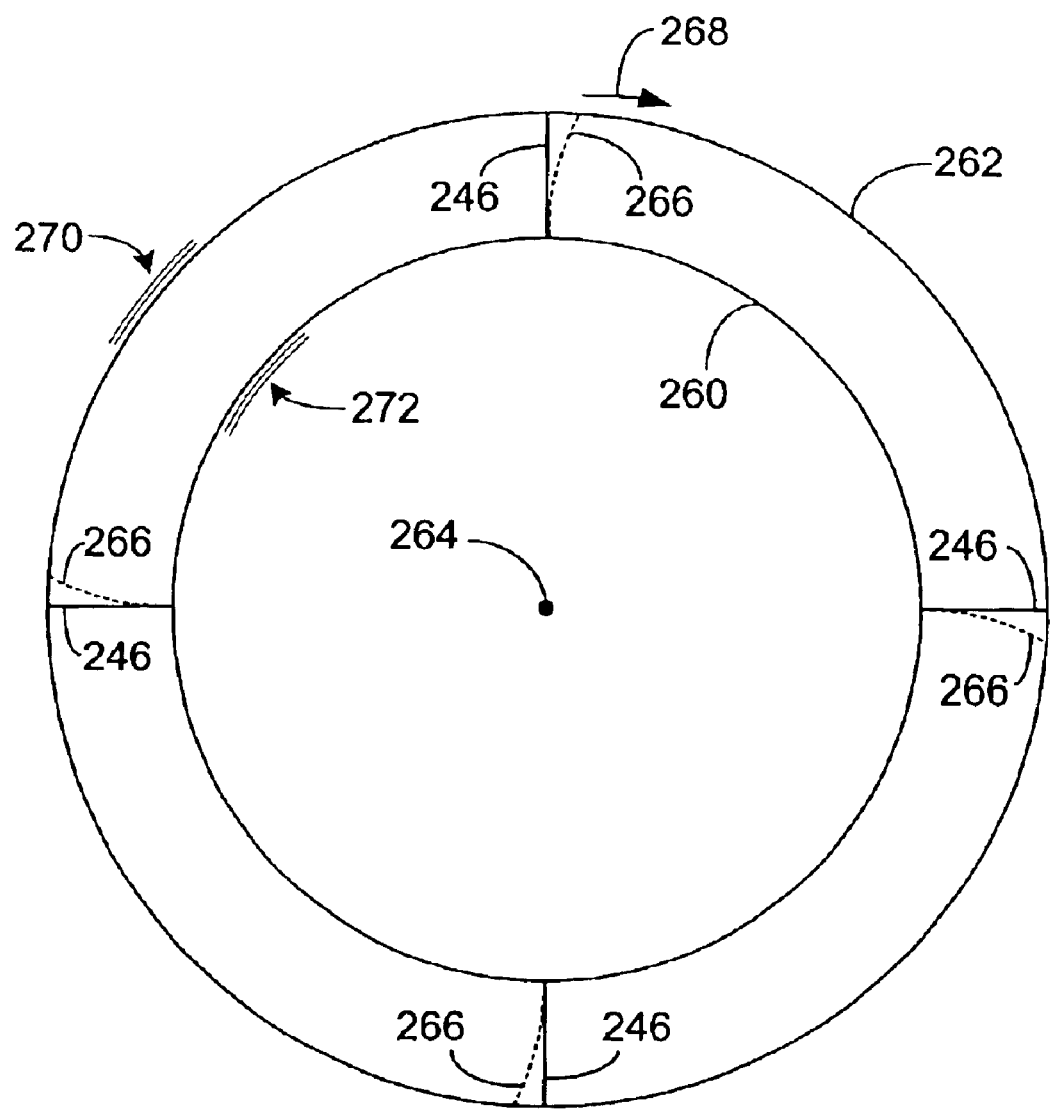
FIG. 5 illustrates a manner in which the spring coupling allows limited relative rotational motion between the first and second actuators.

FIG. 5 now illustrates the relative rotational motion between the first and second actuators (represented by part numbers 260 and 262, respectively). The first and second actuators 260 and 262 are coupled by the four flex sections 246. The second actuator 262 is shown to have rotated clockwise relative to the first actuator 260, as indicated by an arrow 268. As a result, the flex sections 246 are in a flexed configuration as indicated by dotted curves 266. As is understood in the art, each of the flex sections 246 is a leaf type spring that flexes within a limited range when subjected to a force. Furthermore, a flexed leaf spring stores potential energy that may be utilized at a later time when the leaf spring "whips" back and releases the stored energy. Manners in which the flex sections 246 are caused to flex and relax, as well as advantageous features derivable therefrom, are described below in greater detail.

Due to the configuration and arrangement of the flex springs described above in reference to FIGS. 4A and B, the motion of the second actuator 262 is substantially restricted to a rotational motion about an axis 264. The axis 264 is also the axis of rotation of the first actuator 260. Thus, the first and second actuators 260 and 262 may rotate in unison about the axis 264, during which the configuration of the flex sections remain substantially unchanged. Furthermore, the first and second actuators 260, 262 may rotate relative to each other by a limited amount, in which case the configuration of the flex sections changes. Hence, combination of the aforementioned rotational modes of movement, along with the energy aspect of the flex sections, may be utilized to perform improved seek operations in a manner described below in greater detail.

FIG. 5 further illustrates another advantage provided by the spring member. Disturbances (depicted as 272 and 270) to the transducer positions which cause mispositioning errors occur mainly in a direction radially from the disk spindle. Preferably, the disturbance 272 experienced by the first actuator is substantially similar to the disturbance 270 experienced by the second actuator. The common pivot bearing (186 in FIG. 3) of the split actuator provides a common support structure that permits such disturbances to be compensated by each of the two actuators in a predictable and substantially identical manner that is relatively easy. In contrast, if each of the two actuators experiences independent mechanical disturbance, and the disturbance from one actuator affects the other actuator in a non-similar manner, the task of compensating for such disturbances becomes substantially more difficult.

In the embodiment of the spring member described above, the mechanical disturbances in the first and second actuators are effectively transferred to each other, thereby resulting in a substantially common mechanical disturbance. Since the spring member is substantially rigid with respect to relative non-circumferential motions between the first and second actuators, any non-circumferential mode vibration is effectively transferred between the two actuators via the rigid coupling.

Because of such commonality of mechanical vibrations or disturbance between the two actuators, the controller needs to generate only a single correction profile to compensate for both actuators. This essentially cuts in half a compensation demand placed on the controller, thereby reducing total processing power required to control the actuators' positions.

Thus, the mechanical disturbances 270 (of the second actuator 262) and 272 (of the first actuator 260) are substantially common, or at least sufficiently close enough so as to permit implementation of a common compensation process. Such advantage, along with various possible combinations of rotational motions of the first and second actuators 260 and 262, permit the split actuator to perform seek operations that provide advantages described below.

FIGS. 6 and 7 illustrate different types of seek operations that may be performed by the split actuator described above.

In particular, the seek operations take advantage of the fact that the first and second actuators may move a limited amount relative to each other, and that such a relative movement results in energy being stored in the spring coupling. The seek operations further take advantage of the other features of the split actuator described above, such as applying a full current to one actuator whose inertia has been reduced, thereby yielding an increased acceleration.

Figure 6A:
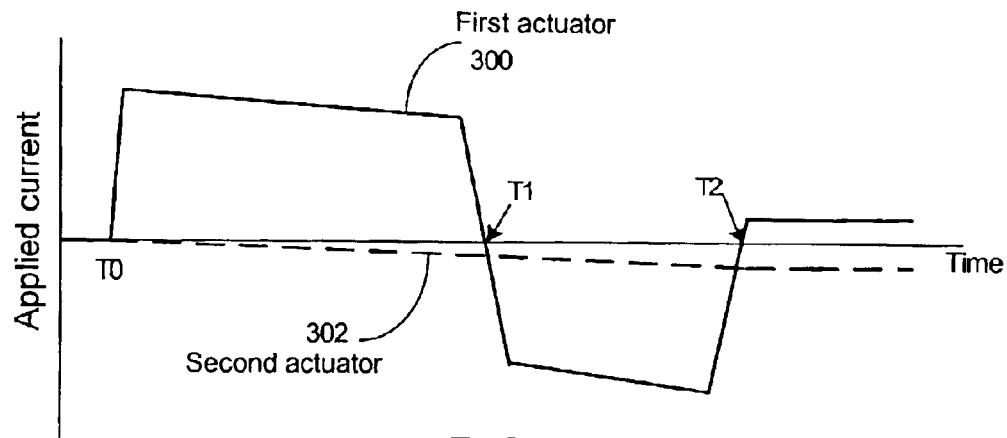
FIG. 6A illustrates profiles of applied current to the first and second actuators performing overlapping motions during a seek operation.
Figure 6B:
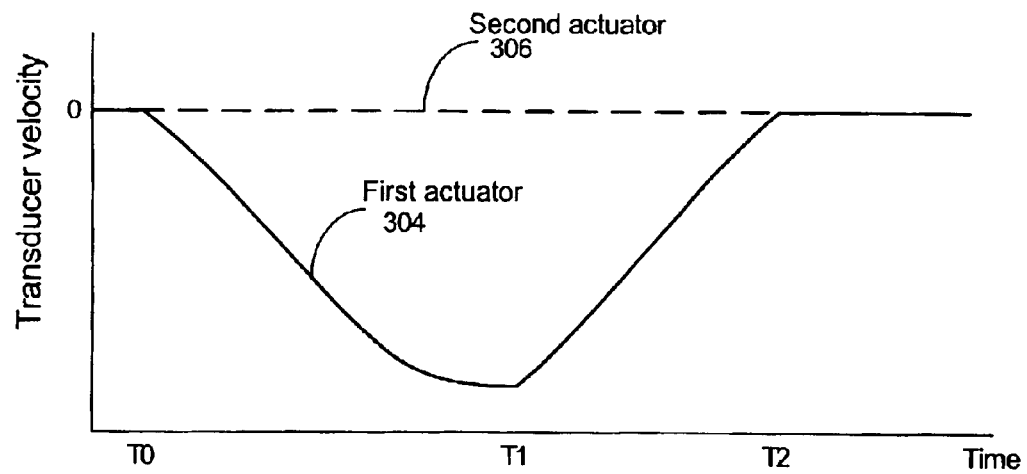
FIG. 6B illustrates profiles of transducer velocity of the first and second actuators performing the overlapping motions.
Figure 6C:
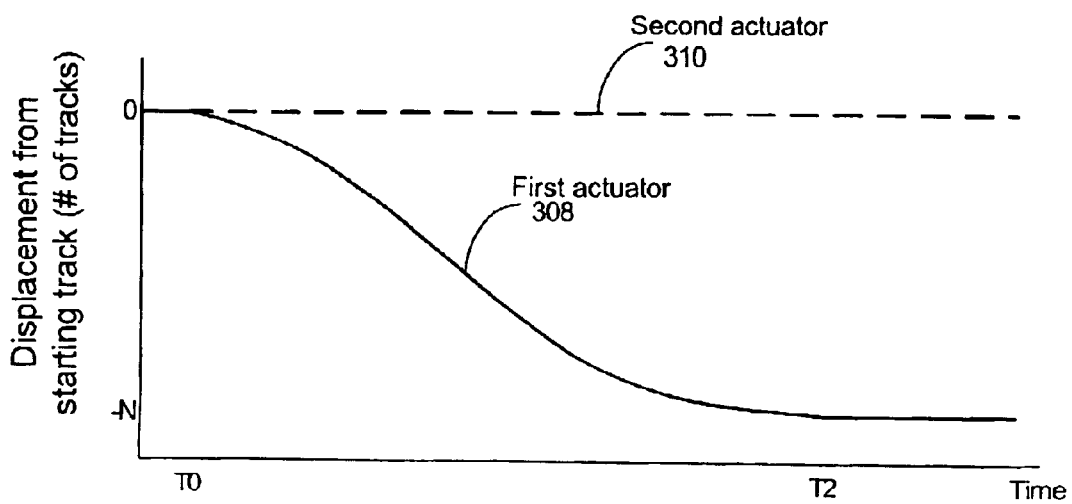
FIG. 6C illustrates profiles of transducer displacement of the first and second actuators performing the overlapping motions.

FIGS. 6A–C illustrate a sequence of movements of the first and second actuators performing a short length seek operation. In particular, FIG. 6A illustrates profiles of applied current to the first actuator (solid line 300) and the second actuator (dashed line 302). FIG. 6B illustrates profiles of transducer velocity of the first and second actuators, and FIG. 6C illustrates displacement profiles of the transducer displacement of the first and second actuators. The split actuator allows the first and second actuators to move independently within a limited range, thereby advantageously allowing overlapping movements. For short seek lengths, such overlapping of the movements of the first and second actuators allow continuity of disk data transfer during a seek operation. That is, one actuator may be stationary over a present track allowing a disk data transfer to be performed by its transducer without interruption, while the other actuator is moving to position the other transducer at a new track.

As the applied current curves 300 and 302 show, the first actuator undergoes a movement operation that begins at time T0 and ends at time T2. Specifically, the first actuator is supplied with an accelerating current between times T0 and T1, and a decelerating current between times T1 and T2. As the first actuator begins to move at time T0, a relatively small current (compared to the acceleration/deceleration current applied to the first actuator) is applied to the second actuator so as to maintain the second actuator over its present track as the first actuator moves away thereby causing the spring member to apply a restorative force on the second actuator. The amount of current applied to the second actuator is proportional to the restorative force of the spring member. As the first actuator moves during T0 to T1 with the second actuator being stationary, the restorative force increases proportionally to the separation of the first and second actuators. As such, the profile of the current applied to the second actuator has a similar shaped profile to the separation profile (curve 308) described below in reference to FIG. 6C.

At time T2, the first actuator has completed its movement operation, and commences a track following operation over the new track. It will be understood that transition between the movement and track following operations may involve a settling phase that is not shown in FIG. 6. At time T2, the transducer of the first actuator is over the new track, and the transducer of the second actuator is over its present track. Thus, a gap-less transition of disk data transfer can be implemented, wherein the second actuator ends its disk data transfer at time T2, and the first actuator begins its disk data transfer at time T2.

In the sequence of movements described in FIG. 6A, a fixed separation exists between the first and second actuators at time T2. Consequently, the spring member applies a fixed restorative force between the first and second actuators, necessitating a relatively small current applied to each of the first and second actuators to counter the restorative force. In one embodiment, the such small fixed current commences at time T2 and continues until next seek operation. In another embodiment, the second actuator is gradually moved (not shown) from its present track to the new track so as to restore the spring member to its rest configuration. Once the spring member is in its rest configuration, the countering current to each of the first and second actuators is no longer necessary.

FIG. 6B illustrates the profiles of the transducer velocity that correspond to the acceleration profile described above in reference to FIG. 6A. The velocity profile 304 for the first actuator shows a typical response to the acceleration and deceleration current between times T0 and T2 described above. The velocity profile 306 of the second profile, however, remains substantially constant at approximately zero, in response to the small countering current described above. The second actuator being stationary between times T0 and T2 allows the transducer of the second actuator to perform disk data transfer while the first actuator is in motion.

FIG. 6C further illustrates how the transducer of the second actuator remains stationary while the first actuator moves. The displacement profile 308 of the first actuator is shown to transition from the present track to the new track that is N-tracks away from the present track. The transition of the transducer of the first actuator is completed at time T2. The profile 310 of the second actuator, however, shows that the transducer of the second actuator remains over the present track between times T0 and T2. At time T2, the first and second actuators are separated by N tracks, and as described above, this separation may be maintained until the next seek operation, or the second actuator may be brought to the new track while the transducer of the first actuator is performing a disk data transfer.

In the sequence of movements described above in reference to FIGS. 6A–C, the first and second actuators are allowed to move mostly independently when the maximum separation of the two actuators is within a specified range. This separation distance was illustrated and described as being N tracks. It will be appreciated that such maximum separation distance in terms of number of tracks is highly dependent on the track density of the disk drive, as well as the spring constant of the spring member. Thus, it will be appreciated that maximum separation distance between the first and second actuators is drive specific, and may change without departing from the spirit of the invention.

The two split actuators and spring coupling therebetween provide several advantages. As described above, the overlapping movements of the first and second actuators allow gap-less continuation of the disk data transfer during a seek operation. Because of this overlapping capability, the effective seek time is zero, and attempts to reduce the seek time is no longer critical for short seek operations. Consequently, the movement operation may be drawn out in time thereby lowering the power requirement during acceleration and deceleration phases. Also, as shown in FIG. 6A, the deceleration phase of the first actuator's movement is shorter than the acceleration phase. This advantageous feature is a result of the spring member using the stored spring energy to help decelerate the first actuator. Specifically, the second actuator is stationary as the first actuator moves between times T0 and T2. Starting from time T0, the spring member begins to store potential energy as the spring member begins to flex, and gradually applies a decelerating force (restorative force) to the first actuator. Between times T0 and T1, the decelerating force has not built up as much as between times T1 and T2. Thus, during the first actuator's deceleration phase between T1 and T2, the built up decelerating force aids in decelerating the first actuator.

Figure 7A:
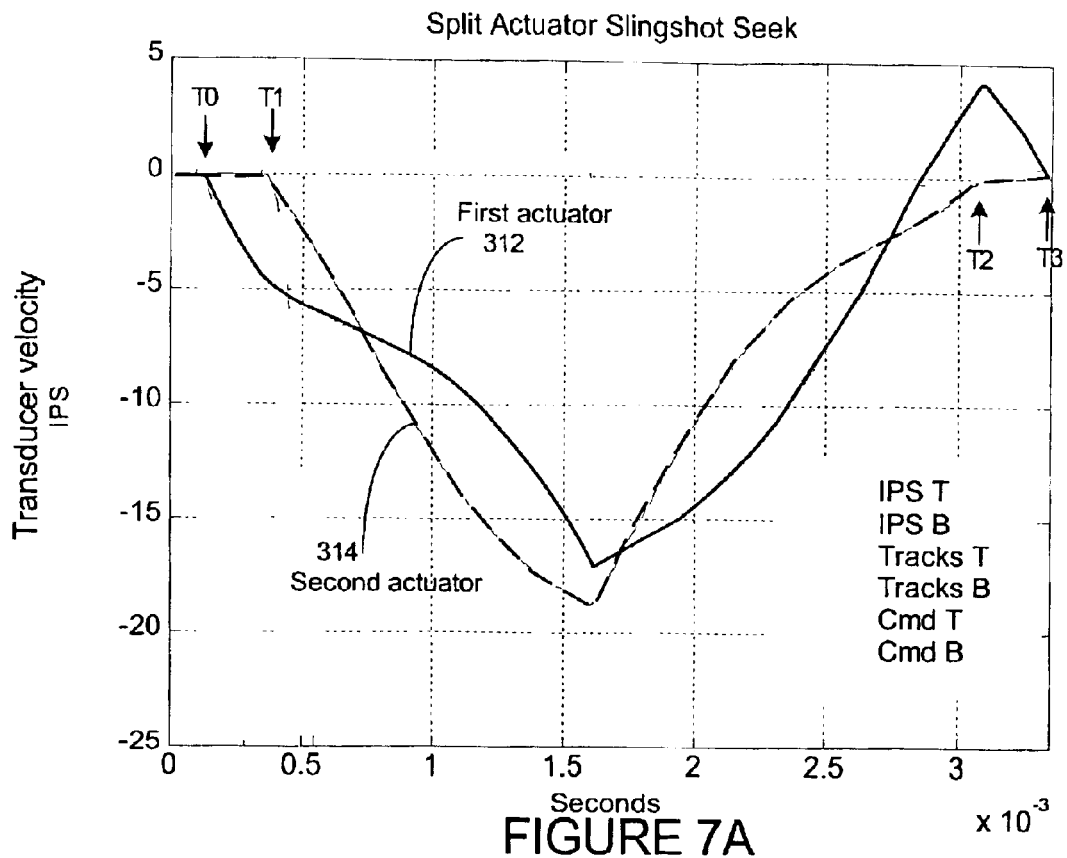
FIG. 7A illustrates profiles of transducer velocity of the first and second actuators performing a slingshot style seek operation.
Figure 7B:
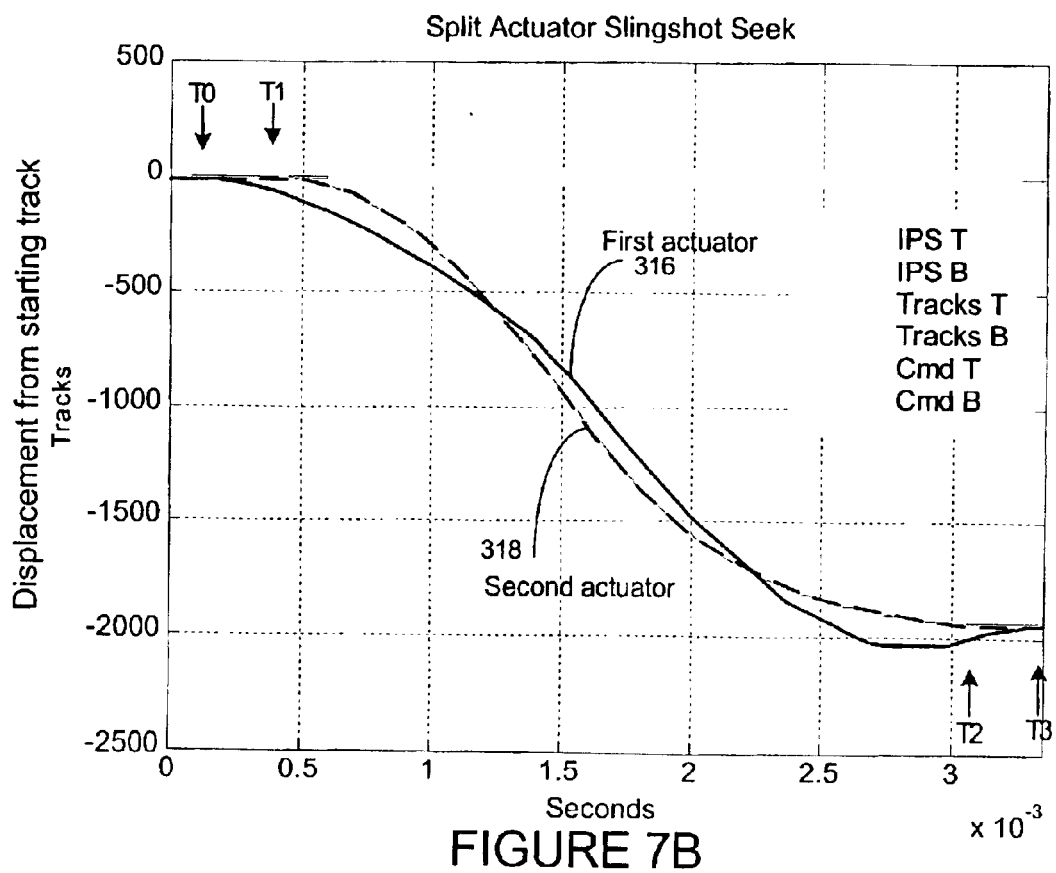
FIG. 7B illustrates profiles of transducer displacement of the first and second actuators performing the slingshot seek operation.

FIGS. 7A–B now illustrate another mode of seek operation that may be implemented using the split actuator. FIG.

7A illustrates transducer velocity profiles 312, 314 of the first and second actuators, and FIG. 7B illustrates transducer displacement profiles 316, 318 of the first and second actuators. Referred to as a slingshot seek operation, the sequence of movements begins at time T0 when the first actuator begins moving towards a new track location as the transducer of the second actuator is still performing a disk data transfer over the present track. At time T1, the second actuator is released from the present track, and also accelerates towards the new track. During the time interval T0 to T1, the first actuator has been separating from the second actuator, thereby allowing the spring member to store potential energy. Consequently, the second actuator is supplied with a small countering current to maintain its position relative to the present track. In one embodiment, the duration of the time interval T0 to T1 corresponds to a selected fraction of the maximum sustainable separation between the first and second actuators. While the second actuator may have completed its disk data transfer, it may be desirable to hold off releasing the second actuator until time T1 in order to benefit from the spring actions described below.

After the second actuator is released at time T1, the second actuator may be allowed to be pulled by the first actuator, or the second actuator may be supplied with its own accelerating/decelerating current. In either case, once the second actuator is released at time T1, the spring member is in a flexed configuration, and the first and second actuators are subject to a spring driven relative motion. As is understood in the art, a spring driven motion generally results in an oscillatory motion between the two spring coupled bodies. This effect is shown in FIG. 7A, where the angular velocities of the first and second actuators form a weaving pattern. This effect is also shown in FIG. 7B, where the position of the transducers oscillate with respect to each other. For example, between times T0 to approximately 1.2 ms, the first actuator is leading. At approximately 1.2 ms, the second actuator overshoots the first actuator and leads the motion until time of approximately 2.2 ms, at which time the lead changes again.

In one embodiment, the profiles of the current applied to the first and second actuators are adapted to utilize the oscillatory nature of the spring interaction in a beneficial manner. Analogous to timing pushing of a swing to enhance the effect, driving of the first and second actuators can be timed so as to enhance the effects of the spring action on the acceleration and deceleration of the first and/or second actuators. For example in FIG. 7A, deceleration currents are applied to the first and second actuators at time of approximately 1.6 ms such that the natural oscillation of the spring member causes the second actuator to come to rest smoothly at time T2. The second actuator then can commence performing disk data transfer at time T2 while the first actuator recovers from overshooting and comes to rest at time T3.

The seek operation described in reference to FIGS. 7A–B, is suitable for longer seek lengths. Having the two actuators permits one transducer to perform disk data transfer while the other one either begins or ends the movement sequence, thereby reducing the overall gap of data transfer during longer seek operations. The spring member further permits the gap to be reduced even more by effectively utilizing the oscillatory nature of the spring member to enhance the acceleration and deceleration of the actuators. Furthermore, because each of the two actuators has smaller moment of inertia, application of a 'standard' power (for standard actuator) results in increased acceleration. In one embodiment, the acceleration of one of the two actuators may be as much as twice that of the standard actuator.

It will be appreciated that the sequence of movement operations described above in reference to FIG. 7 may be modified to permit the first actuator (as opposed to the second actuator) to reach and settle on the new track without departing from the spirit of the invention. Furthermore, the seek operations described above in reference to FIGS. 6–7 may be combined in any number of ways to suit various situations without departing from the spirit of the invention.

Figure 8:
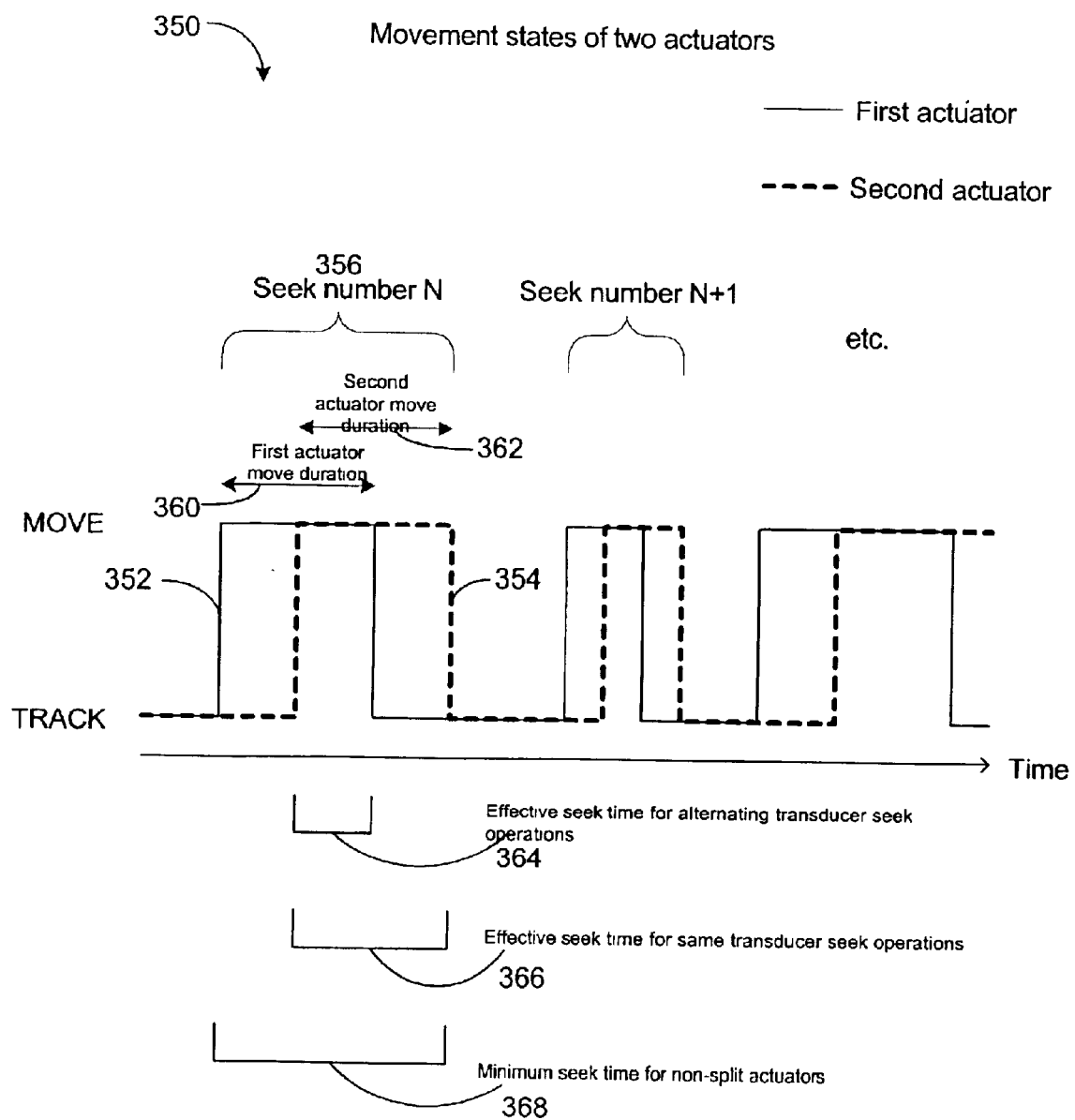
FIG. 8 illustrates a generalized diagram showing a series of seek operations, wherein the split nature of the actuator and the spring coupling provide reduction in effective seek time.

The various types of seek operations described above in reference to FIGS. 6 and 7 are now generalized in FIG. 8 as a diagram 350 of movement states of the first and second actuators. The first actuator is represented by a solid curve 352, and the second actuator is represented by a dashed curve 354. The diagram illustrates an N-th seek operation 356. A seek operation number N+1 that follows is also illustrated to show that the representative N-th seek operation 356 is one of a plurality of similar operations performed.

The seek operation can be characterized in terms of each actuator's state of movement. Each actuator is either in motion (move state) or tracking (track state). While it is known that tracking involves movements at a sub-track width level, such movements are relatively small compared to seek level displacements. As such, it will be assumed in description of FIG. 8 that the track state means a stationary actuator.

The seek operation comprises transition of states of the first and second actuators in a sequence track-move-track. Without loss of any generality, the first actuator is selected to lead the second actuator, such that the seek operation begins when the first actuator transitions to the move state, and ends when the second transitions to the track state from the move state. The first actuator remains in the move state for a duration 360, and the second actuator remains in the move state for a duration 362.

Given such a state diagram, it will be appreciated from the foregoing description of the split actuator that the first actuator's move duration 360 is advantageously reduced by the split nature of the first actuator. Furthermore, the second actuator's move duration 362 is advantageously reduced by utilization of the spring coupling's ability to store and release potential energy.

Aside from the general reduction in movement durations due to the spring coupled actuators, the types of seek operation can further determine effective seek time associated with the seek operation. The effective seek time is referred to above as the dead time, and relates to a temporal gap in the transfer of data to and from the disk. In the seek operation type described above in reference to FIGS. 6A–C, the transducers of the two actuators alternate in performing the disk data transfer. Associated with such seek operation is an effective seek time 364. In the seek operation type described above in reference to FIG. 7, one transducer performs the disk data transfer before and after a given seek. Associated with such seek operation is an effective seek time 366. It will be appreciated that a sequence of seek operations may comprise a combination of the two types described above without departing from the spirit of the invention. Determining which type to utilize may be performed by the controller (400 in FIG. 2) based on seek related factor(s). For example, the alternating transducer type seek operation, may be more suited for relatively short seek length, while relatively long seek length may be better served by the same transducer type seek operation. Such seek optimization, or seek reordering, is an inherent feature of many disk operating systems.

FIG. 8 further illustrates a minimum seek time 368 associated with the seek operation 356 perform by a non-split actuator. Because the non-split actuator does not benefit from the dual actuator aspect or the spring coupling aspect, the resulting seek time 368 is greater than either of the effective seek times 364 and 366 described above.

Aside from the advantages provided by reduction in dead times between disk data transfer as stated above, the spring member that spring couples the two actuators permits the aforementioned advantageous features to be realized while overcoming many of the obstacles that prevent traditional dual actuators from achieving similar level of performance. In particular, the spring member couples the first and second actuators in such a way that relative motion therebetween is substantially restricted to a rotational motion about a substantially common axis. This feature is made possible by the configuration of the flex springs as described above. Furthermore, the first and second actuators are made to rotate about a common pivot bearing, thereby being subjected to a common mechanical disturbance. The spring member also effectively transmits such mechanical disturbance between the first and second actuators so as to contribute to the commonality of the disturbance.

By nature of the spring interaction between the first and second actuators, the relative motion therebetween can be utilized to improve the acceleration and deceleration of one actuator by being aided by the other. Furthermore, such relative motions rely on action-reaction spring forces that are essentially isolated between the two actuators, thereby not negatively contributing to the acoustics of the disk drive.

Another advantage provided by the spring coupling and the exemplary seek operation modes relates to disk data transfer being performed by one transducer at a time. In one embodiment, the data transfer is performed through a single data channel, made possible by the disk data transfer being performed by one transducer at a time. By utilizing the single data channel, presumably the same data channel already configured in many of the existing disk drives, the advantages of the split actuator may be implemented in such disk drives without performing costly data channel related modifications.

What is claimed is:

1. A disk drive comprising:
    a rotatable disk having a magnetic recording media formed on a surface of the rotatable disk wherein the rotatable disk defines a plurality of concentric data tracks;
    a pivot point positioned adjacent the rotatable disk wherein the pivot point defines an axis;
    a rotatable pivot assembly positioned on the pivot point so as to rotate about the axis defined by the pivot point;
    a first actuator having a first transducer coupled to the pivot assembly so as to be rotatable about the axis wherein the first actuator extends over the surface of the rotatable disk such that rotation of the pivot assembly results in movement of the first transducer over the surface of the rotatable disk such that the first transducer can be positioned adjacent selected data tracks;
    a first coil that is disposed with respect to the first actuator so as to induce movement of the first actuator and the first transducer with respect to the surface of the disk;
    a second actuator having a second transducer coupled to the pivot assembly so as to be rotatable about the axis wherein the second actuator extends over the surface of the rotatable disk such that rotation of the pivot assembly results in movement of the second transducer over the surface of the rotatable disk such that the second transducer can be positioned adjacent selected data tracks;
    a second coil that is disposed with respect to the second actuator so as to induce movement of the second actuator and the second transducer with respect to the surface of the disk; and
    a mechanical interconnect structure that couples the first and second actuators so as to permit limited relative movement of the first and second actuators such that when the pivot assembly is rotated to a first angular position with the first transducer in a first position adjacent a first selected data track and the second transducer is in a second position adjacent a second selected data track, the first transducer can be moved by the first coil to a third position adjacent a third selected data track without moving the second transducer from the second selected data track.

2. The disk drive of claim 1, wherein the second actuator is coupled to the pivot assembly by the mechanical interconnect structure thereby coupling the first and second actuators wherein the first and second actuators are influenced by a common vibration associated with the pivot assembly.

3. The disk drive of claim 2, wherein the disk drive comprises one or more disks wherein each disk defines a top surface and a bottom surface.

4. The disk drive of claim 3, wherein each of the first and second actuators comprises at least one arm wherein at least one transducer is disposed on each of the at least one arm and wherein the at least one arm of the first actuator is arranged with respect to the at least one arm of the second actuator in an alternating manner such that the alternating arms are arranged in an interleaving manner with respect to the one or more disks.

5. The disk drive of claim 4, wherein the disk drive comprises two disks.

6. The disk drive of claim 5, wherein the first actuator comprises two arms and wherein the second actuator comprises one arm interposed between the two arms of the first actuator.

7. The disk of claim 4, wherein the disk drive comprises three disks.

8. The disk of claim 7, wherein the first actuator comprises two arms and wherein the second actuator comprises two arms that alternate with the two arms of the first actuator.

9. The disk drive of claim 2, wherein the pivot assembly comprises a cylindrical member having a cylindrical axis that is substantially co-axial with the axis defined by the pivot point wherein the cylindrical member is adapted to allow mounting of the first and second actuators such that the first and second actuators are mechanically coupled.

10. The disk drive of claim 1, wherein the mechanical interconnect structure is a spring member that spring couples the first and second actuators.

11. The disk drive of claim 10, wherein the spring member comprises a plurality of flex sections wherein each flex section is a vertically oriented panel with a first edge attached to a portion of the first actuator and a second edge attached to a portion of the second actuator wherein the first and second edges are two opposing edges.

12. The disk drive of claim 11, wherein the flex sections allow relative motion of the first and second actuators in a first mode while resisting other modes of the relative motion.

13. The disk drive of claim 12, wherein the first and second edges of the flex section are inner and outer edges that attach to the first and second actuators respectively.

14. The disk drive of claim 13, wherein the spring member comprises four flex sections distributed substantially evenly circumferentially so as to provide symmetry about the axis defined by the pivot wherein the symmetry of the arrangement of the flex sections inhibits non-rotational relative motion between the first and second actuators.

15. The disk drive of claim 11, wherein the flex sections allow a limited spring-coupled rotational relative motion between the first and second actuators.

16. The disk drive of claim 10, wherein the spring member acquires and stores potential energy as the first and second actuators undergo relative rotational displacement.

17. The disk drive of claim 16, wherein the spring member releases the stored potential energy at a selected instance so as to facilitate subsequent rotational relative motion of the first and second actuators.

18. The disk drive of claim 17, wherein each of the first and second actuators has a reduced inertia thereby allowing greater acceleration for a given applied power.

19. The disk drive of claim 18, wherein the spring member allows the first transducer to begin moving in a seek operation while the second transducer is performing a disk data transfer on a selected data track.

20. The disk drive of claim 19, wherein separate movements of the first and second actuators reduces a dead time during which disk data transfer is not being performed.

21. The disk drive of claim 20, wherein the dead time is substantially zero for seek operations involving seek lengths less than a selected distance.

22. The disk drive of claim 16, wherein controlling of the motion of the first and second actuators is performed so as to utilize the oscillatory property of the spring member thereby enhancing the controlling effect on the motion of the first and second actuators.

23. A disk drive comprising:
    a rotatable disk having a magnetic recording media formed on a surface of the rotatable disk wherein the rotatable disk defines a plurality of concentric data tracks;
    a first actuator having a first transducer and a first coil mounted to a pivot assembly so as to be rotatable about an axis defined by the pivot assembly wherein the first coil induces movement of the first actuator;
    a second actuator having a second transducer and a second coil mounted on the pivot assembly so as to be rotatable about the axis defined by the pivot assembly wherein the second coil induces movement of the second actuator; and
    a spring member that interconnects and provides a spring coupling between the first and second actuators such that motion of one actuator affects the other actuator wherein the spring coupling allows the spring member to acquire spring potential energy during a first relative motion of the first and second actuators and release at least a selected portion of the acquired spring potential energy during a second relative motion thereby increasing the rate at which the second relative motion occurs and wherein the spring coupling involves a force that is mutual between the two actuators and generally isolated therebetween such that effects of the force on other parts of the disk drive is reduced.

24. The disk drive of claim 23, wherein the spring coupling provided by the spring member allows one of the two actuators to be controlled predictably in response to motion of the other actuator.

25. The disk drive of claim 24, wherein the first actuator moves while the second actuator remains over a selected data track wherein the second actuator is controlled to compensate for the spring member acquiring the spring potential energy thereby allowing the first transducer to initiate a seek operation while the second transducer is performing a disk data transfer.

26. The disk drive of claim 25, wherein mechanical disturbance experienced by one actuator is transferred to the other actuator predictably via the spring coupling thereby allowing the coupled mechanical disturbance to be compensated in both actuators in a simplified manner.

27. The disk drive of claim 23, wherein the spring member includes a structure that allows relative motion of the first and second actuators in a first mode while resisting other modes of the relative motion.

28. The disk drive of claim 27, wherein the spring member allows a limited range of rotational relative motion between the first and second actuators about the axis defined by the pivot assembly wherein the spring member also inhibits non-rotational relative motions between the first and second actuators.

29. The disk drive of claim 28, wherein the spring member comprises a plurality of flex sections wherein each flex section is a vertically oriented panel with a first edge attached to a portion of the first actuator and a second edge attached to a portion of the second actuator wherein the first and second edges are two opposing edges.

30. The disk drive of claim 29, wherein the first and second edges of the flex section are inner and outer edges that attach to the first and second actuators respectively.

31. The disk drive of claim 30, wherein the spring member comprises four flex springs distributed substantially evenly circumferentially so as to provide symmetry about the axis defined by the pivot wherein the symmetry of the arrangement of the flex springs inhibits non-rotational relative motion between the inner and outer portions.

32. The disk drive of claim 23, wherein the spring member acquires and stores potential energy as the first and second actuators undergo relative rotational displacement.

33. The disk drive of claim 32, wherein the spring member releases the stored potential energy at a selected instance so as to facilitate subsequent rotational relative motion of the first and second actuators.

34. The disk drive of claim 33, wherein each of the first and second actuators has a reduced inertia thereby allowing greater acceleration for a given applied power.

35. The disk drive of claim 34, wherein the spring member allows the first transducer to begin moving in a seek operation while the second transducer is performing a disk data transfer on a selected data track.

36. The disk drive of claim 32, wherein separate movements of the first and second actuators reduces a dead time during which disk data transfer is not being performed.

37. The disk drive of claim 36, wherein the dead time is substantially zero for seek operations involving seek lengths less than a selected distance.

38. The disk drive of claim 32, wherein controlling of the motion of the first and second actuators is performed so as to utilize the oscillatory property of the spring member thereby enhancing the controlling effect on the motion of the first and second actuators.

39. A method of performing a seek operation in a hard disk drive comprising a rotatable disk having a magnetic recording media, and an actuator assembly that includes a first transducer mounted on a first rotatable actuator and a second transducer mounted on a second rotatable actuator, the method comprising:
    initiating movement of the first actuator at time T0 while maintaining the second transducer at a first location on the disk to perform a disk data transfer, wherein the resulting relative motion of the first and second actuators causes an interaction of the first and second actuators wherein the interaction causes some of kinetic energy of the relative motion to be stored as potential energy; and terminating the disk data transfer of the second transducer at the first location at time T1 and initiating movement of the second actuator wherein at least a portion of the potential energy stored as a result of the interaction of the first and second actuators is converted into kinetic energy of the second actuator thereby increasing the rate of the second actuator's movement.

40. The method of claim 39, wherein initiating movement of the first actuator comprises initially supplying the first actuator with a substantially full power available to both actuators so as to cause an increased acceleration of the first actuator.

41. The method of claim 40, wherein the increased acceleration of the first actuator reduces duration of first actuator's movement.

42. The method of claim 39, wherein maintaining the second transducer at the first location while the first actuator is moving comprises supplying the second actuator with controlled power to compensate for interaction between the first and second actuators.

43. The method of claim 42, wherein the interaction between the first and second actuators is a spring-coupled interaction.

44. The method of claim 43, wherein initiating movement of the second actuator comprises releasing the second actuator by stopping the controlled power thereby allowing the spring-coupled second actuator to be accelerated along with the first actuator.

45. The method of claim 44, wherein the spring coupling reduces duration of the second actuator's movement.

46. The method of claim 39, further comprising stopping the first actuator and performing a disk data transfer with the first transducer while the second actuator is still in motion.

47. The method of claim 46, wherein switching of the second transducer to the first transducer as the disk operating transducer reduces a dead time during which disk data transfer is not being performed.

48. The method of claim 47, wherein the dead time is substantially zero for seek operations involving seek lengths less than a selected distance.

49. The method of claim 46, wherein stopping the first actuator comprises supplying the first actuator with a substantially full power available to both actuators so as to cause an increased deceleration of the first actuator.

50. The method of claim 39, further comprising stopping the first actuator and utilizing the spring member to facilitate stopping of the second actuator wherein the second transducer performs a disk data transfer after the second actuator has stopped.

51. The method of claim 50, wherein stopping the second actuator comprises controlling the deceleration of the first and second actuators such that oscillatory motion between the two actuators due to the spring interaction enhances the effects of the controlled deceleration.

* * * * *